(12) United States Patent
Komatsuzaki et al.

(10) Patent No.: US 11,415,406 B2
(45) Date of Patent: Aug. 16, 2022

(54) SINGLE SIDEBAND FREQUENCY MODULATED LASER MEASUREMENT FOR DETECTING A DIFFERENCE IN A PROPAGATION DISTANCE

(71) Applicants: Mitutoyo Corporation, Kanagawa (JP); 3D Innovation Co., Ltd, Sendai Miyagi (JP)

(72) Inventors: Shinji Komatsuzaki, Mito (JP); Tomotaka Takahashi, Tsukuba (JP); Hiroki Ujihara, Tsukuba (JP)

(73) Assignees: Mitutoyo Corporation, Kanagawa (JP); 3D Innovation Co., Ltd, Sendai Miyagi (JP)

( * ) Notice: Subject to any disclaimer, the term of this patent is extended or adjusted under 35 U.S.C. 154(b) by 0 days.

(21) Appl. No.: 17/125,896

(22) Filed: Dec. 17, 2020

(65) Prior Publication Data
US 2021/0190474 A1    Jun. 24, 2021

(30) Foreign Application Priority Data
Dec. 18, 2019   (JP) .............................. JP2019-228280

(51) Int. Cl.
*G01B 9/02002* (2022.01)
*G01B 11/14* (2006.01)
(Continued)

(52) U.S. Cl.
CPC ..... *G01B 9/02002* (2013.01); *G01B 9/02027* (2013.01); *G01B 11/14* (2013.01);
(Continued)

(58) Field of Classification Search
CPC ............ G01B 9/02002; G01B 9/02027; G01B 11/14; G01B 11/2441; G01B 9/02003;
(Continued)

(56) References Cited

U.S. PATENT DOCUMENTS

| 7,239,763 B2 | 7/2007 | Kawanishi et al. |
| 7,245,787 B2 | 7/2007 | Kawanishi et al. |
| 2013/0044311 A1* | 2/2013 | Rakuljic ............... G01C 15/002 356/5.09 |

FOREIGN PATENT DOCUMENTS

| CN | 111600188 A * | 8/2020 |
| JP | 3583906 | 11/2004 |

(Continued)

OTHER PUBLICATIONS

Takefumi Hara, "Distance Sensing by FSL Laser and its Application", Optonews, vol. 7, No. 3, 2012, pp. 25-31 (with partial Computer Generated English Translation).

*Primary Examiner* — Hwa Andrew Lee
(74) *Attorney, Agent, or Firm* — Oblon, McClelland, Maier & Neustadt, L.L.P.

(57) ABSTRACT

A laser apparatus, a measurement apparatus, and a measurement method are provided in which the laser apparatus outputs a frequency-modulated laser beam with a plurality of modes and includes: an optical cavity that has a gain medium for amplifying a light to be input, and an optical SSB modulator for shifting a frequency of the light amplified by the gain medium: and a control part that controls the optical SSB modulator to shift a frequency of a light to be input to the optical SSB modulator.

13 Claims, 14 Drawing Sheets

(51) Int. Cl.
  *G01B 11/24* (2006.01)
  *H01S 3/106* (2006.01)
  *H01S 3/067* (2006.01)
  *G01B 9/02015* (2022.01)

(52) U.S. Cl.
  CPC ...... *G01B 11/2441* (2013.01); *H01S 3/06791* (2013.01); *H01S 3/1062* (2013.01); *H01S 3/1068* (2013.01)

(58) Field of Classification Search
  CPC ............ G01B 9/02004; G01B 9/02008; G01B 9/02081; H01S 3/06791; H01S 3/1062; H01S 3/1068; H01S 3/08027; H01S 3/107; H01S 3/106; H01S 3/10053; G01S 7/4814; G01S 7/4911; G01S 17/34
  See application file for complete search history.

(56) References Cited

FOREIGN PATENT DOCUMENTS

| | | |
|---|---|---|
| JP | 3667148 | 1/2007 |
| JP | 4524482 | 8/2010 |

* cited by examiner

SINGLE SIDEBAND FREQUENCY MODULATED LASER MEASUREMENT FOR DETECTING A DIFFERENCE IN A PROPAGATION DISTANCE

CROSS-REFERENCE TO RELATED APPLICATIONS

The present application claims priority to Japanese Patent Applications number 2019-228280, filed on Dec. 18, 2019. The contents of this application are incorporated herein by reference in their entirety.

BACKGROUND

A frequency-shifted feedback laser (FSFL) which is provided with a frequency shifter in a cavity (resonator) and outputs a plurality of longitudinal-mode lasers whose oscillation frequencies vary linearly with time is known. Also, an optical distance meter using such an FSFL is known (see, e.g., Patent Document 1, the Specification of Japanese Patent. No. 3583906, and Non-Patent Document 1, "Distance Sensing by FSF Laser and Its Application," by Takefumi HARA, Optonews, Vol. 7, No. 3, 2012, pp. 25-31). Also, an optical single-sideband (SSB) modulator, as a frequency shifter, is known (see, e.g., Patent Document 2, the Specification of Japanese Patent. No. 3867148, and Patent Document 3, the Specification of Japanese Patent. No. 4524482).

As such an FSFL, a configuration in which a frequency shifter using acousto-optic elements and provided in the cavity is known. The acousto-optic elements are elements that output a diffracted light having a frequency which is shifted, by a frequency of ultrasonic signals, from a frequency of an input light when the light is input to a region where the ultrasonic signals are propagated in the elements. Such sound optical elements could not easily change (i) a frequency to be shifted and (ii) positive or negative sign of the frequency. Therefore, the FSFL using such acousto-optic elements could not easily change an amount of a frequency shift and a direction of the frequency shift.

SUMMARY

This disclosure focuses on this point, and an object of the disclosure is to easily change the amount and/or direction of the shift applied to a frequency of the FSFL.

A first aspect provides a laser apparatus for outputting a frequency-modulated laser beam with a plurality of modes, the laser apparatus including: an optical cavity that has a gain medium for amplifying a light to be input, and an optical SSB modulator for shifting a frequency of the light amplified by the gain medium; and a control part that controls the optical SSB modulator to shift a frequency of a light to be input to the optical SSB modulator.

A second aspect provides a measurement apparatus including the laser apparatus according to the first aspect of the disclosure; a branching part that branches a portion of the frequency-modulated laser beam output by the laser apparatus as a reference light and at least some of the remaining portion of the frequency-modulated laser beam as a measurement light; a beat signal generation part that generates a beat signal by mixing the reference light and a reflected light that is reflected by radiating the measurement light onto an object to be measured; and a detection part that detects a difference in a propagation distance between the reference light and the measurement light by frequency-analyzing the beat signal.

A third aspect provides a measurement method including: setting a frequency shift amount and a frequency shift direction of an optical SSB modulator; outputting a frequency-modulated laser beam with a plurality of modes from a laser apparatus that includes an optical cavity having a gain medium and the optical SSB modulator; branching a portion of the frequency-modulated laser beam output by the laser apparatus as a reference light and at least some of the remaining portion of the frequency-modulated laser beam as a measurement light; generating a first beat signal by mixing the reference light and a reflected light that is reflected by radiating the measurement light onto an object to be measured; and detecting a difference in a propagation distance between the reference light and the measurement light based on a frequency analysis result of the first beat signal.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration Example of a Laser Apparatus 110]

Figure 1:
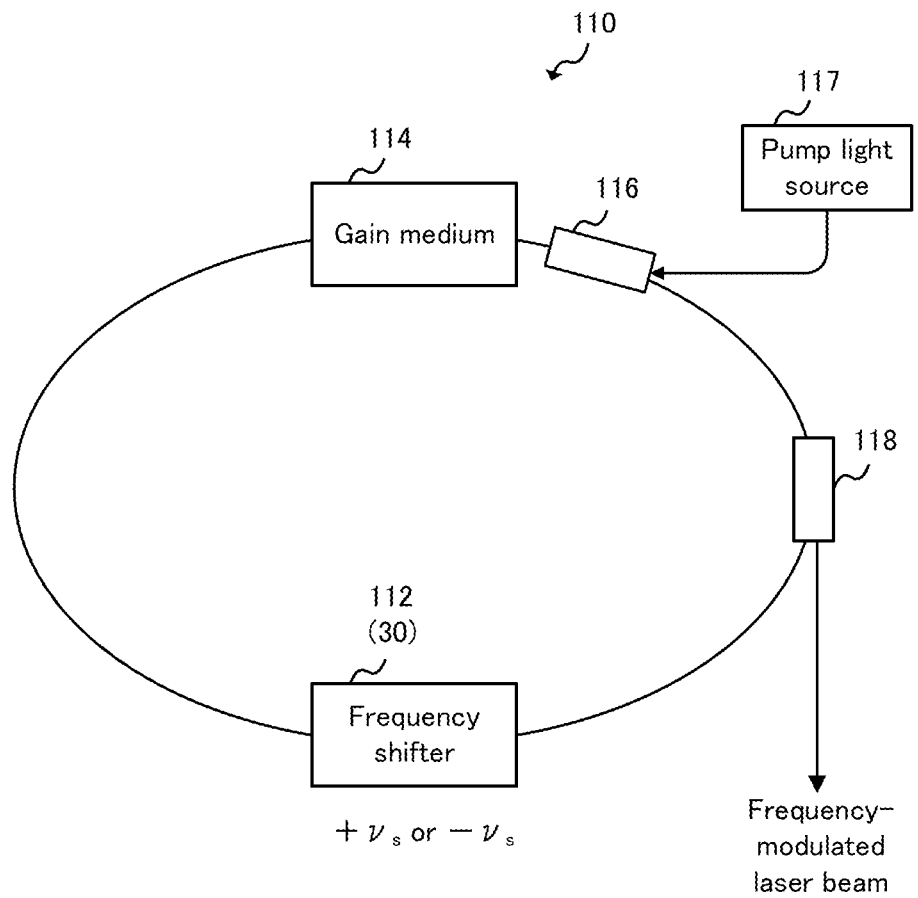
FIG. 1 shows a configuration example of a laser apparatus 110 according to the present embodiment.

FIG. 1 shows a configuration example of a laser apparatus 110 according to the present embodiment. The laser apparatus 110 shown in FIG. 1 shows an example of a frequency-shifted feedback laser (FSFL) that outputs a frequency-modulated laser beam with a plurality of modes. The laser apparatus 110 has an optical cavity (laser resonator) and oscillates the laser beam within the optical cavity. The optical cavity of the laser apparatus 110 includes a frequency shifter 112, a gain medium 114, a WDM coupler 116, a pump light source 117, and an output coupler 118.

The frequency shifter 112 shifts a frequency of a light to be input by an approximately constant frequency. Here, a frequency shift amount by the frequency shifter 112 is defined as $+v_s$ or $-v_s$. For example, the frequency shifter 112 shifts the frequency of the light circulating around the cavity to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser oscillated in the cavity.

That is, the laser apparatus 110 shown in FIG. 1 contains a fiber ring laser having the frequency shifter 112 in the cavity. The laser apparatus 110 preferably further includes an isolator in the cavity. Also, the laser apparatus 110 may have an optical bandpass filter that passes light of a predetermined wavelength band in the cavity.

An acousto-optic frequency shifter (AOFS) having acousto-optic elements has been known as the frequency shifter 112 used for the laser apparatus 110. Next, the AOFS will be described.

[Configuration Example of an AOFS 20]

Figure 2:
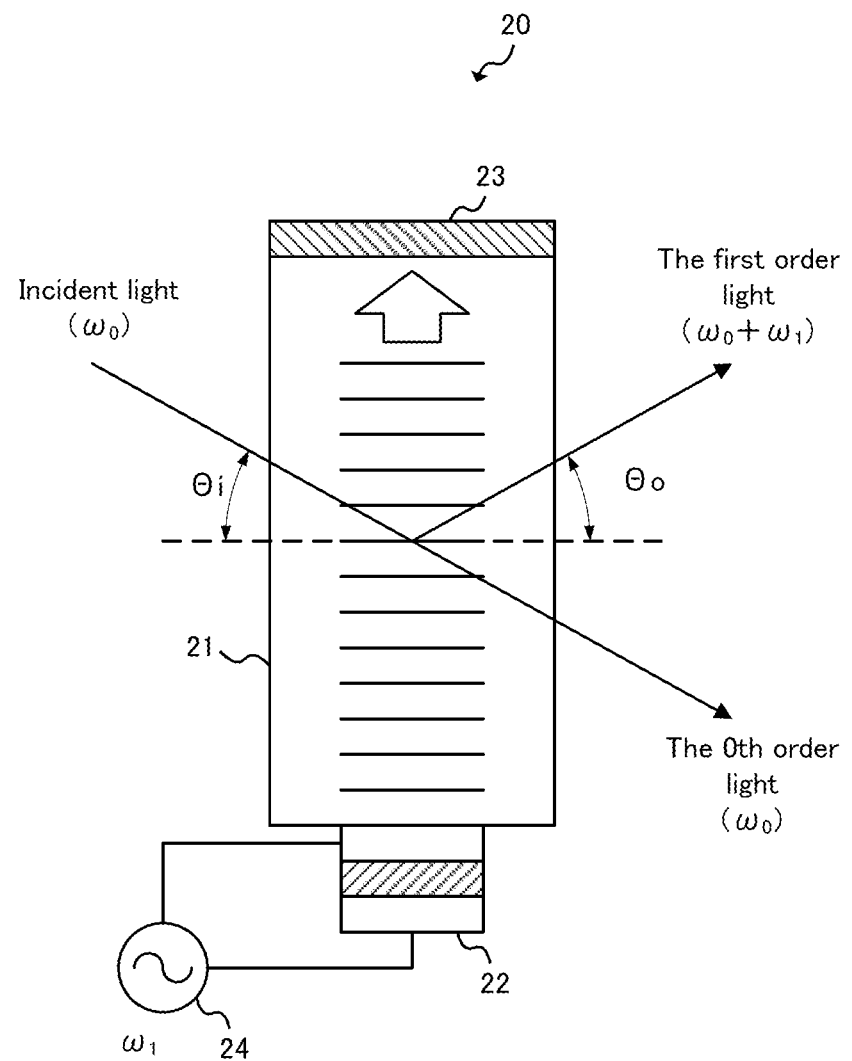
FIG. 2 shows a configuration example of an acousto-optic frequency shifter (AOFS) 20.

FIG. 2 shows a configuration example of an AOFS 20. The AOFS 20 includes an optical crystal 21, an ultrasonic transducer 22, an ultrasonic absorber 23, and an oscillator 24. The optical crystal 21 is a crystal, such as $TeO_2$, $PbMoO_4$, dense flint glass, or the like, that transmits light.

The ultrasonic transducer 22 is provided on the first end face of the optical crystal 21, and generates ultrasonic waves dependent on an electrical signal of frequency $\omega_1$ supplied from the oscillator 24. The ultrasonic transducer 22, for example, propagates the ultrasonic waves generated from the first end face of the optical crystal 21 to the second end face that opposes the first end face. In FIG. 2, an example of a propagation direction of the ultrasonic waves is indicated by an arrow. It should be noted that the ultrasonic absorber 23 is provided on the second end face that opposes the first end face of the ultrasonic transducer 22 of the optical crystal 21.

A refractive index modulation occurs inside the optical crystal 21 due to the propagation of the ultrasonic waves. When light is incident to such an optical crystal 21, the incident light is diffracted by Raman-Nath diffraction. The frequency of the diffracted light is shifted from a frequency $\omega_0$ of the incident light by a frequency $\omega_1$ of the ultrasonic waves due to a Doppler effect caused by the propagation of the ultrasonic waves. Since the frequency of the diffracted light is shifted on the basis of the Doppler effect in this manner, the positive or negative sign of the frequency to be shifted is determined according to the propagation direction of the ultrasonic waves and an incident direction of the incident light. FIG. 2 shows an example in which the direction of the frequency shift is positive and the frequency of the diffraction light is $\omega_0+\omega_1$.

For example, to generate an intense diffracted light, a refractive index grating spacing d realized by ultrasonic waves, a wavelength $\lambda$ of a light wave, an incident angle $\theta i$ of the light wave, a diffraction angle $\theta o$, and the h-th order of the diffraction must satisfy a relationship of $d(\sin \theta i - \sin \theta o) = h\lambda$, where $h=0, \pm 1, \pm 2$, etc. When h is positive, the frequency shift becomes positive; when h is negative, the frequency shift becomes negative; and when h is zero, the frequency shift does not occur. In general, $\lambda$ and $\theta i$ are fixed, and $\theta o$ is adjusted such that either a diffracted light with $h=+1$ or $h=-1$ is taken out.

Therefore, to switch the positive or negative sign of the frequency to be shifted in the AOFS 20, for example, the propagation direction of the ultrasonic waves needed to be switched to the opposite direction, or an incident angle of the light needed to be changed. Since the propagation direction of the ultrasonic waves and the incident angle of the light cannot be easily changed by an electrical signal or the like, it has been difficult to switch the shift direction of the frequency in the conventional laser apparatus 110 using such an AOFS 20.

Further, the ultrasonic transducer 22 cannot generate ultrasonic waves having a frequency greatly deviated from a cavity frequency, since the ultrasonic transducer 22 has cavity frequencies (resonator frequencies) that rely on materials. Further, a diffraction angle of the light diffracted by the optical crystal 21 is an angle corresponding to the frequency of the ultrasonic waves. When the diffraction angle changes according to the frequency shift amount, a coupling loss with an optical system on the output side occurs. Therefore, it was difficult to freely change the shift amount of the frequency to be shifted in the AOFS 20. Therefore, the laser apparatus 110 according to the present embodiment makes it possible to easily switch the amount and/or direction of the shift applied to the frequency by using an optical single-sideband (SSB) modulator as the frequency shifter 112. Such an optical SSB modulator will be described below.

[Configuration Example of an Optical SSB Modulator 30]

Figure 3:
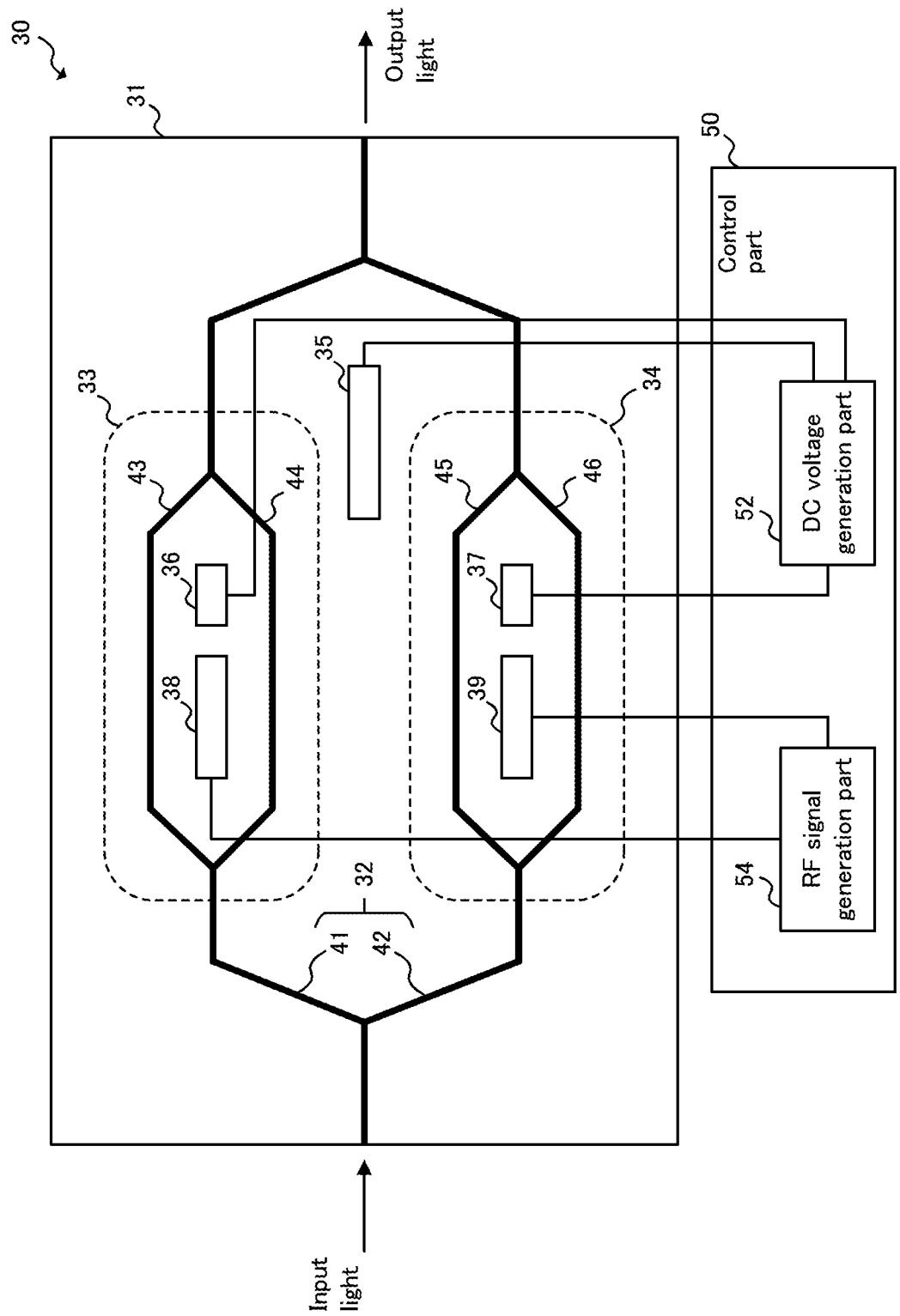
FIG. 3 shows a configuration example of an optical SSB modulator 30 and a control part 50 according to the present embodiment.

FIG. 3 shows a configuration example of an optical SSB modulator 30 and a control part 50 according to the present embodiment. The optical SSB modulator 30 includes a substrate 31, a main Mach-Zehnder waveguide 32, a first sub Mach-Zehnder waveguide 33, a second sub Mach-Zehnder waveguide 34, a main DC electrode 35, a first sub DC electrode 36, a second sub DC electrode 37, a first RF electrode 38, and a second RF electrode 39.

The substrate 31 is a substrate at least partially formed of an electro-optical crystal, and includes, for example, an $LiNbO_3$ crystal. On a surface of such a substrate 31, a waveguide and a substrate are formed. The main Mach-Zehnder waveguide 32 branches a light, which is input to the optical SSB modulator 30, into two, and outputs the branched lights after multiplexing them. The main Mach-Zehnder waveguide 32 has a first arm waveguide 41 that passes one of the branched lights and a second arm waveguide 42 that passes the other branched light.

The first arm waveguide 41 includes the first sub Mach-Zehnder waveguide 33. The first sub Mach-Zehnder waveguide 33 branches, into two, the light which the first arm waveguide 41 passes, and outputs the branched lights to the first arm waveguide 41 after multiplexing them. The first sub Mach-Zehnder waveguide 33 has a first sub arm waveguide 43 and a second sub arm waveguide 44 that pass the input light.

The second arm waveguide 42 includes the second sub Mach-Zehnder waveguide 34. The second sub Mach-Zehnder waveguide 34 branches, into to two, the light which the second arm waveguide 42 passes, and outputs the branched lights to the second arm waveguide 42 after multiplexing them. The second sub Mach-Zehnder waveguide 34 has a third sub arm waveguide 45 and a fourth sub arm waveguide 46 that pass the input light.

The main DC electrode 35, as an example, is provided at a position approximately the same distance from each of the first arm waveguide 41 and the second arm waveguide 42 of the main Mach-Zehnder waveguide 32. A DC voltage is supplied from the control part 50 to the main DC electrode 35.

The first sub DC electrode 36 and the first RF electrode 38, as an example, are provided at a position approximately the same distance from each of the first sub arm waveguide 43 and the second sub arm waveguide 44 of the first sub Mach-Zehnder waveguide 33. The first sub DC electrode 36 and the first RF electrode 38 may be separate electrodes or may be one common electrode.

Similarly, the second sub DC electrode 37 and the second RF electrode 39, as an example, are provided at a position approximately the same distance from each of the third sub arm waveguide 45 and the fourth sub arm waveguide 46 of the second sub Mach-Zehnder waveguide 34. The second sub DC electrode 37 and the second RF electrode 39 may be separate electrodes or may be one common electrode.

A DC voltage is supplied from the control part 50 to the first sub DC electrode 36 and the second sub DC electrode 37. An RF signal is supplied from the control part 50 to each of the first RF electrode 38 and the second RF electrode 39. The RF signal is, for example, a high frequency signal of several GHz to tens of GHz.

As such, when the voltage is applied to the electrode provided near the waveguide that passes the input light, an electro-optic effect (Pockels effect) that changes the refractive index of the waveguide is produced. The amplitude intensity level and the phase of the light passing through the waveguide in which the electro-optic effect has occurred experience modulation, offset, etc. corresponding to the applied voltage. Since change in the refractive index due to such an electro-optic effect corresponds to an application direction of an electric field, for example, it is possible to switch the change direction of the phase simply by changing the positive or negative sign of the voltage applied to the electrode.

The control part 50 adjusts the phase of the light passing through the waveguide by supplying the DC voltage and the RF signal to a plurality of electrodes of the optical SSB modulator 30. The control part 50 has a DC voltage generation part 52 and an RF signal generation part 54. The DC voltage generation part 52 generates a DC voltage and supplies the DC voltage to the main DC electrode 35, the first sub DC electrode 36, and the second sub DC electrode 37. The RF signal generation part 54 generates the RF signal and supplies the RF signal to the first RF electrode 38 and the second RF electrode 39.

The control part 50 controls the DC voltage generation part 52 and the RF signal generation part 54 to supply the DC voltage and the RF signal to the optical SSB modulator 30, and adjusts the frequency shift direction and the frequency shift amount. For example, the control part 50 shifts the frequency of the light input to the optical SSB modulator 30 by the frequency of the RF signal. The control part 50 may further set the frequency shift amount of the optical SSB modulator 30 by changing the frequency of the RF signal.

Further, the control part 50 switches the frequency shift direction by supplying the DC voltage of a predetermined value to the main DC electrode 35, the first sub DC electrode 36, and the second sub DC electrode 37 that are provided on the substrate 31 and correspond to the main Mach-Zehnder waveguide 32, the first sub Mach-Zehnder waveguide 33, and the second sub Mach-Zehnder waveguide 34. Since such switching of the frequency shift and the shift direction of the optical SSB modulator 30 are described in known Patent Documents 2 and 3, detailed description thereof is omitted here.

As described above, the laser apparatus 110 according to the present embodiment uses the optical SSB modulator 30 shown in FIG. 3 as the frequency shifter 112. The control part 50 sets the frequency of the RF signal supplied to the optical SSB modulator 30, thereby making it possible to set a frequency shift amount of the optical SSB modulator 30. Further, the control part 50 switches the voltage supplied to the optical SSB modulator 30, thereby making it possible to switch the frequency shift direction of the optical SSB modulator 30 to one of the positive side or the negative side. By doing this, it is possible to easily set (i) the shift amount and (ii) a positive or negative direction for the shift of the frequency of the laser apparatus 110. Frequency characteristics of the laser beam output from such a laser apparatus 110 will be described below.

Figure 4:
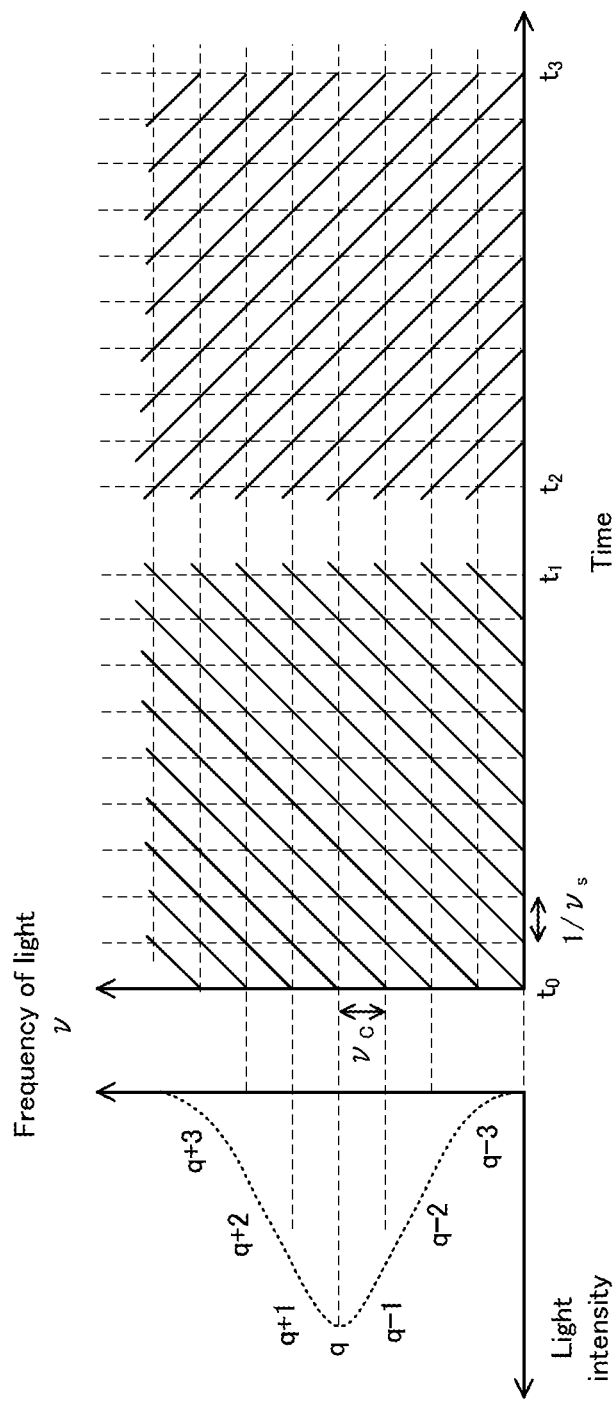
FIG. 4 shows an example of a laser beam output from the laser apparatus 110 according to the present embodiment.

FIG. 4 shows an example of the laser beam output from the laser apparatus 110 according to the present embodiment. FIG. 4 shows, on the left, a light spectrum of the laser beam output by the laser apparatus 110 at the time $t_0$. In the light spectrum, the horizontal axis indicates the light intensity, and the vertical axis indicates the frequency of light. Also, a plurality of longitudinal modes of the light spectrum are denoted by the numbers q. The frequencies of the plurality of longitudinal modes are arranged at approximately constant frequency intervals. Supposing that $\tau_{RT}(=1/v_c)$ denotes the time for light to go around the cavity, the plurality of longitudinal modes are arranged at intervals of $1/\tau_{RT}(=v_c)$, as represented by the following equation. It should be noted that, $v_0$ is the initial frequency of the light spectrum at the time $t_0$.

$$v_q(t_0) = v_0 + \frac{q}{\tau_{RT}} \qquad \text{[Equation 1]}$$

FIG. 4 shows, on the right, changes in frequencies with the passage of time of the plurality of longitudinal modes output by the laser apparatus 110. On the right side of FIG. 4, the horizontal axis indicates the time and the vertical axis indicates the frequency. That is, FIG. 4 shows a change over time in the frequency of the laser beam output from the laser apparatus 110 on the right side, and shows an instantaneous frequency of the laser beam at the time $t_0$ on the left side.

In the laser apparatus 110, a shift amount for the frequency shifter 112 is set to $+v_s$, as an example, and each time the light in the cavity goes around the cavity, the frequency shifter 112 increases the frequency of the light traveling around the cavity by $v_s$. That is, since the frequency of each of the modes increases by $v_s$ for every passing of $\tau_{RT}$, the rate of change of frequency dv/dt (i.e. chirp rate) becomes approximately equal to $v_s/\tau_{RT}$. Therefore, the plurality of longitudinal modes represented by Equation 1 change as shown in the following equation with the passage of the time t.

$$v_q(t) = v_0 + \frac{v_s}{\tau_{RT}}t + \frac{q}{\tau_{RT}} \quad \text{[Equation 2]}$$

It should be noted that in Equation 2, the shift direction of the frequency is in a plus direction (positive direction). On the right side of FIG. 4, an example of the change over time in the frequency of the laser beam when the shift direction of the frequency is in a positive direction is shown, for a period between the time $t_0$ and the time $t_1$. Alternatively, if the shift direction of the frequency is in a minus direction (negative direction), the sign of $v_s$ in $v_s \cdot t/\tau_{RT}$, which is the second term of Equation 2, is negative. On the right side of FIG. 4, an example of the change over time in the frequency of the laser beam when the shift direction of the frequency is in a negative direction is shown, for a period between the time $t_2$ and the time $t_3$.

As described above, the laser apparatus 110 using the optical SSB modulator 30 as the frequency shifter 112 can switch the shift direction of the frequency in one of the positive direction or the negative direction. Also, the laser apparatus 110 can easily change the frequency shift amount. Therefore, the optical SSB modulator 30 can execute the change of the amount and direction of the frequency shift without changing an output angle. That is, the laser apparatus 110 can easily change the amount and direction of the frequency shift while hardly changing the output power. When such a laser apparatus 110 is used in an optical distance meter or the like, accuracy improvement, functional improvement, and the like of the distance measurement can be easily realized. Next, an optical distance meter including the laser apparatus 110 according to the present embodiment is described.

[Configuration Examples of a Measurement Apparatus 100]

Figure 5:
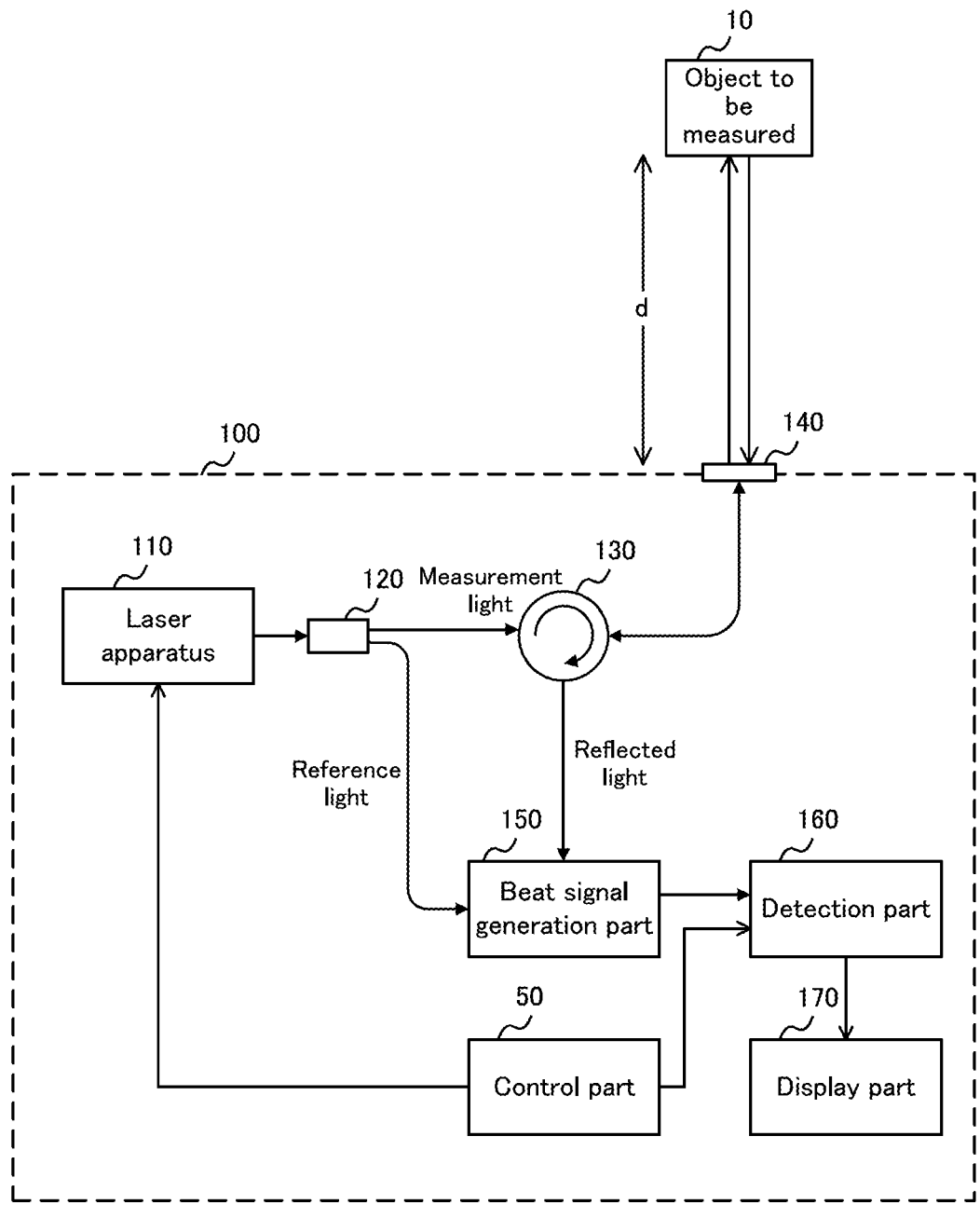
FIG. 5 shows a configuration example of a measurement apparatus 100 according to the present embodiment together with an object to be measured 10.

FIG. 5 shows a configuration example of a measurement apparatus 100 according to the present embodiment together with an object to be measured 10. The measurement apparatus 100 optically measures a distance between the measurement apparatus 100 and the object to be measured 10. Also, the measurement apparatus 100 may measure a three-dimensional geometry of the object to be measured 10 by scanning a position of the laser beam radiated onto the object to be measured 10. The measurement apparatus 100 includes the control part 50, the laser apparatus 110, a branching part 120, the optical circulator 130, an optical head part 140, a beat signal generation part 150, the detection part 160, and a display part 170.

The control part 50 supplies the DC voltage and the RF signal for controlling the laser apparatus 110. The laser apparatus 110 is the frequency-shifted feedback laser having the optical SSB modulator 30. The control part 50 and the laser apparatus 110 will not be described here since they have already been described.

The branching part 120 branches the frequency-modulated laser beam output from the laser apparatus 110, with a portion of it as a reference light and at least some of the remaining portion of it as a measurement light. The branching part 120 is, for example, a fiber optic coupler. In the example of FIG. 5, the branching part 120 supplies the measurement light to the optical circulator 130, and the reference light to the beat signal generation part 150.

The optical circulator 130 has a plurality of input/output ports. For example, the optical circulator 130 outputs a light, which is input from one port, to the next port, and outputs a light, which is input from the next port, to the port after next. FIG. 5 shows an example in which the optical circulator 130 has three input/output ports. In this case, the optical circulator 130 outputs the measurement light supplied from the branching part 120 to the optical head part 140. Also, the optical circulator 130 outputs a light input from the optical head part 140 to the beat signal generation part 150.

The optical head part 140 radiates the light input from the optical circulator 130 toward the object to be measured 10. The optical head part 140 includes, for example, a collimator lens. In this case, the optical head part 140 first adjusts the light input from the optical circulator 130 via an optical fiber into a beam shape using the collimator lens, and then outputs the light.

Also, the optical head part 140 receives a reflected light of the measurement light radiated onto the object to be measured 10. The optical head part 140 focuses the received reflected light onto the optical fiber with a collimator lens and supplies it to the optical circulator 130. In this case, the optical head part 140 may include one common collimator lens, and the collimator lens may irradiate the object to be measured 10 with the measurement light, and may receive the reflected light from the object to be measured 10. The distance between the optical head part 140 and the object to be measured 10 is defined as d.

Alternatively, the optical head part 140 may include a focusing lens. In this case, the optical head part 140 focuses the light input from the optical circulator 130 via the optical fibers on the surface of the object to be measured 10. The optical head part 140 receives at least a part of the reflected light reflected on the surface of the object to be measured 10. The optical head part 140 focuses the received reflected light onto an optical fiber using the focusing lens and supplies the light to the optical circulator 130. Also in this case, the optical head part 140 may include one common focusing lens, and that focusing lens may irradiate the object to be measured 10 with the measurement light and receive the reflected light from the object to be measured 10.

The beat signal generation part 150 receives, from the optical circulator 130, the reflected light that is the measurement light radiated onto and reflected from the object to be measured 10. Also, the beat signal generation part 150 receives the reference light from the branching part 120. The beat signal generation part 150 mixes the reflected light and the reference light to generate a beat signal. The beat signal generation part 150 includes, for example, a photoelectric conversion element, converts the beat signal into an electrical signal, and outputs the electrical signal.

Here, since the reflected light travels back and forth across the distance from the optical head part 140 to the object to be measured 10, a difference in a propagation distance corresponding to at least the distance 2d occurs as compared with the reference light. Since the oscillation frequency of the light output from the laser apparatus 110 changes linearly with the passage of time, a frequency difference, which is dependent on a propagation delay corresponding to the difference in the propagation distance, occurs between the oscillation frequency of the reference light and the oscillation frequency of the reflected light. The beat signal generation part 150 generates a beat signal corresponding to such a frequency difference.

The detection part 160 detects the difference in the propagation distance between the reference light and the measurement light by frequency-analyzing the beat signal generated with the beat signal generation part 150. The frequency analysis of the detection part 160 will be described below.

The display part 170 displays the analysis result of the detection part 160. The display part 170 may include a display or the like and display the detection result. Also, the display part 170 may store the analysis result in a storage unit or the like.

The measurement apparatus 100 described above can measure a distance between the measurement apparatus 100 and the object to be measured 10 by analyzing the frequency difference between the reflected light of the measurement light radiated onto the object to be measured 10 and the reference light. That is, the measurement apparatus 100 can form a non-contact and non-destructive optical distance meter.

[Details of a Distance Measurement Process]

The measurement apparatus 100 according to the present embodiment measures a distance d between the optical head part 140 and the object to be measured 10 by using the laser apparatus 110 that outputs the frequency elements represented by Equation 2. Suppose that an optical path difference between the reference light and the reflected light is only the distance 2d, which is the reciprocated distance d, and the propagation delay corresponding to the distance 2d is Δt. That is, when the measurement light is reflected and returned from the object to be measured 10 at the time t, the frequency of the returned reflected light approximately matches the past frequency that is a time Δt earlier than the time t, and therefore can be expressed by the following equation.

$$v_q(t - \Delta t) = v_0 + \frac{v_s}{\tau_{RT}}(t - \Delta t) + \frac{q}{\tau_{RT}} \qquad \text{[Equation 3]}$$

On the other hand, the reference light at the time t can be expressed by the following equation in a similar manner as with Equation 2, where the reference light is $v_{q'}(t)$.

$$v_{q'}(t) = v_0 + \frac{v_s}{\tau_{RT}}t + \frac{q'}{\tau_{RT}} \qquad \text{[Equation 4]}$$

Because the beat signal generation part 150 superimposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B(m, d)$, $v_B(m, d)$ can be expressed by the following equation from Equations 3 and 4, where m is an interval of the longitudinal mode numbers (=q−q') and Δt=2d/c.

$$v_B(m, d) = v_{q'}(t) - v_q(t - \Delta t) = \frac{v_s}{\tau_{RT}} \cdot \frac{2d}{c} - \frac{m}{\tau_{RT}} \qquad \text{[Equation 5]}$$

From Equation 5, the distance d is expressed by the following equation, where $1/\tau_{RT} = v_c$.

$$d = \frac{c}{2v_s v_c}\{v_B(m, d) + mv_c\} \qquad \text{[Equation 6]}$$

From Equation 6, it can be understood that the distance d can be calculated from a frequency observation result of the beat signal by determining the interval m of the longitudinal mode numbers. It should be noted that the interval m, called the order m of the beat signal, can be determined by detecting a change in beat signals when a frequency shift amount $v_s$ of the laser apparatus 110 is changed. Since such a method of determining the order m is known, as described in Patent Document 1 or the like, its detailed description is omitted.

Since the observed beat signal is always a positive frequency, in calculation, the beat signal generated on the negative frequency side is folded back on the positive side and observed as an image signal. Next, the generation of such an image signal will be described.

Figure 6:
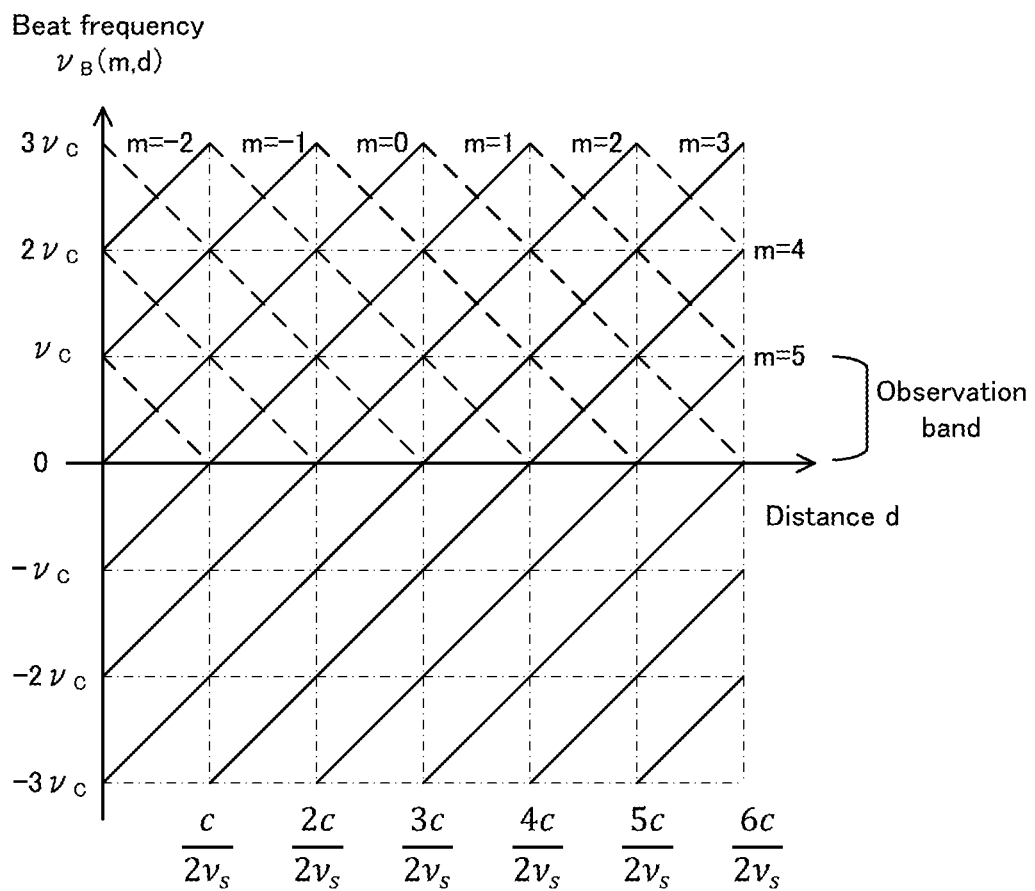
FIG. 6 shows an example of a relationship between (i) a frequency of a beat signal detected by the measurement apparatus 100 according to the present embodiment and (ii) a distance d between an optical head part 140 and the object to be measured 10.

FIG. 6 shows an example of the relationship between the frequency of the beat signal detected by measurement apparatus 100 according to the present embodiment and the distance d between the optical head part 140 and the object to be measured 10. In FIG. 6, the horizontal axis indicates the distance d, and the vertical axis indicates the frequency $v_B(m, d)$ of the beat signal. The plurality of straight lines shown by the solid lines in FIG. 6 are graphs showing the relation of the frequency $v_B(m, d)$ of the beat signal with respect to the distance d for each of a plurality of values of the order m, as shown in Equation 5.

As shown in FIG. 6, a plurality of beat signals corresponding to the value of m are generated. However, since the plurality of longitudinal modes included in each of the reflected light and the reference light are arranged at approximately constant frequency intervals $v_c$, a plurality of beat signals having equal values of m are superimposed on the approximately same frequency on the frequency axis. For example, when a frequency band between frequencies 0 and $v_c$ is observed, a plurality of beat signals are superimposed on approximately the same frequency and are observed as a single line spectrum.

In addition, the absolute value of the frequency $v_B(m, d)$ of the beat signal in the negative range smaller than 0 is further observed as the image signal. That is, the graph of the region in which the vertical axis of FIG. 6 is smaller than 0 is folded back with a frequency 0 as a boundary. FIG. 6 shows the folded image signal by a plurality of dotted lines. Since only the positive and negative of the folded image signals are inverted, the image signals are superimposed on the observed frequency axis at the same frequency as the absolute value of the frequency before being folded. For example, when a frequency band between frequencies 0 and $v_c$ is observed, the beat signal and the image signal are respectively located at different frequencies unless the frequencies of the beat signal and the image signal become $v_c/2$.

As described above, in the observation band between the frequencies 0 and $v_c$, two line spectra are generated, which are (i) the beat signal $v_B(m, d)$ and (ii) the image signal $v_B(m', d)$ whose value of m is different from that of the beat signal $v_B(m, d)$. Here, as an example, m'=m+1. In this case, the beat signal generation part 150 can cancel such an image signal by using a quadrature detection. Next, the beat signal generation part 150 and the detection part 160 using the quadrature detection will be described.

[Configuration Example of the Beat Signal Generation Part 150 and the Detection Part 160]

Figure 7:
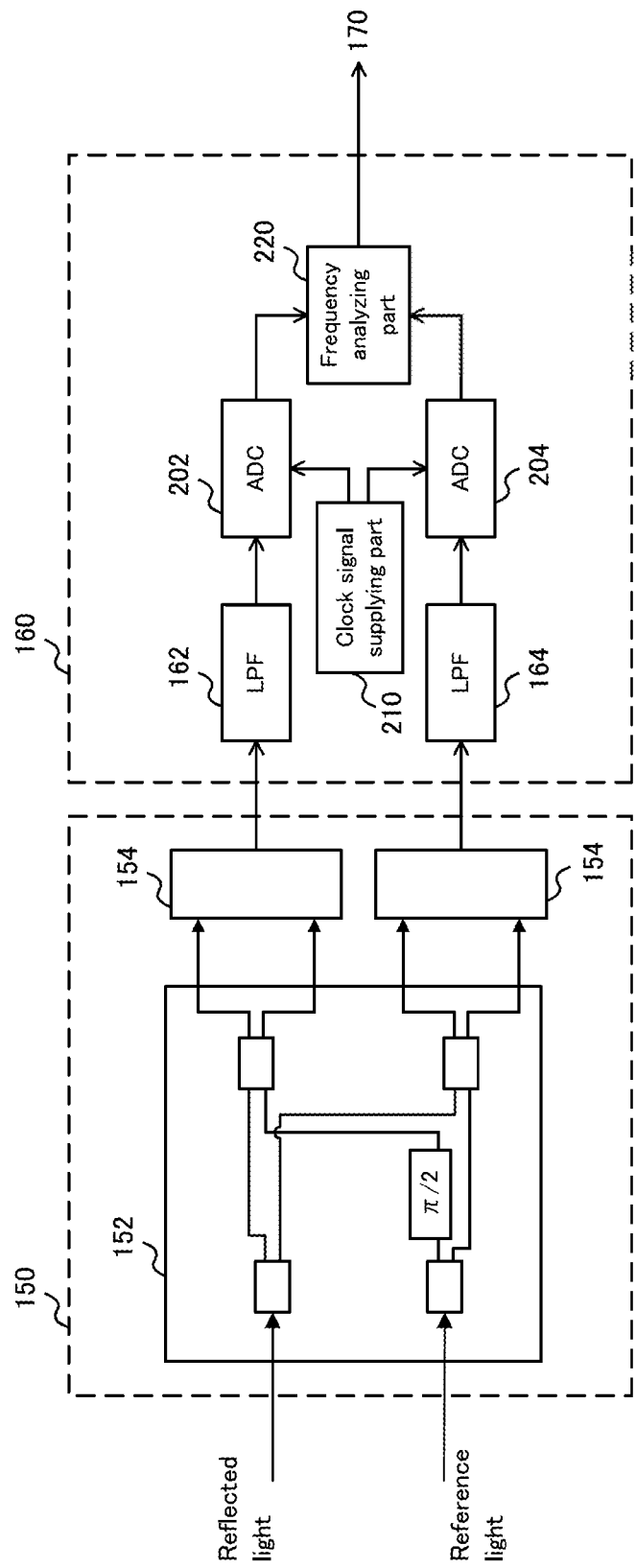
FIG. 7 shows a configuration example of a beat signal generation part 150 and a detection part 160 according to the present embodiment.

FIG. 7 shows a configuration example of the beat signal generation part 150 and the detection part 160 according to the present embodiment. The beat signal generation part 150 quadrature-detects the reflected light and the reference light.

The beat signal generation part 150 includes an optical 90-degree hybrid 152 and two photoelectric conversion parts 154.

The optical 90-degree hybrid 152 respectively branches the input reflected light and the input reference light into two. The optical 90-degree hybrid 152 multiplexes one of the branched reflected lights and one of the branched reference lights with an optical coupler or the like to generate the first beat signal. The optical 90-degree hybrid 152 multiplexes the other branched reflected light and the other branched reference light with the optical coupler or the like to generate the second beat signal. Here, the optical 90-degree hybrid 152 generates a beat signal after generating a phase difference of 90 degrees between the two branched reference lights. For example, the optical 90-degree hybrid 152 multiplexes the branched reflected light with one of the branched reference light and multiplexes the branched reflected light with a light generated by the other branched reference light passing through a $\pi/2$ wavelength plate.

The photoelectric conversion parts 154 receive the multiplexed reflected light and reference light and convert them into electrical signals. The photoelectric conversion parts 154 may each be, for example, a photodiode or the like. The photoelectric conversion parts 154 are each, for example, a balanced photodiode. In FIG. 7, suppose that one of the photoelectric conversion parts 154 generates a first beat signal and the other photoelectric conversion parts 154 generates a second beat signal. As described above, the beat signal generation part 150 performs the quadrature detections by multiplexing two reference lights and two reflected lights having phases differing by 90 degrees, respectively, and outputs two beat signals to the detection part 160.

The detection part 160 performs a frequency analysis on the two beat signals. Here, an example in which the detection part 160 performs the frequency analysis using the first beat signal as an I signal and the second beat signal as a Q signal will be described. The detection part 160 includes a first filter part 162, a second filter part 164, a first AD conversion part 202, a second AD conversion part 204, a clock signal supplying part 210, and a frequency analyzing part 220.

The first filter part 162 and the second filter part 164 reduce signal components in a frequency band differing from a frequency band that a user or the like wants to analyze. Here, the frequency band that the user or the like wants to analyze is set from 0 to $v_c$. The first filter part 162 and the second filter part 164 are, for example, low-pass filters that pass signal components having a frequency equal to or less than $v_c$. In this case, the first filter part 162 supplies the first beat signal obtained by reducing the signal components having a frequency higher than the frequency $v_c$ to the first AD conversion part 202. Also, the second filter part 164 supplies the second beat signal obtained by reducing the signal components having a frequency higher than the frequency $v_c$ to the second AD conversion part 204.

The first AD conversion part 202 and the second AD conversion part 204 convert input analog signals into digital signals. For example, the first AD conversion part 202 converts the first beat signal into a digital signal, and the second AD conversion part 204 converts the second beat signal into a digital signal. The clock signal supplying part 210 supplies clock signals to the first AD conversion part 202 and the second AD conversion part 204. By doing this, the first AD conversion part 202 and the second AD conversion part 204 convert the analog signals into the digital signals at approximately the same sampling rate as a clock frequency of the received clock signal.

Here, when the observation band is from 0 to $v_c$, the frequency of the beat signals is at most the cavity frequency $v_c$ of the optical cavity. Therefore, the clock signal supplying part 210 supplies clock signals having a frequency greater than or equal to twice the cavity frequency $v_c$ of the optical cavity to the first AD conversion part 202 and the second AD conversion part 204, whereby the beat signals can be observed. Here, the frequency of two times or more of the cavity frequency $v_c$ shall be a sampling frequency. In this manner, the detection part 160 performs the frequency analysis on the first beat signal and the second beat signal being generated by sampling the beat signals at the sampling frequency, as first sampling data.

The frequency analyzing part 220 converts the first beat signal and the second beat signal into frequency data. As an example, the frequency analyzing part 220 performs a digital Fourier transform (DFT) on the first beat signal and the second beat signal. The frequency analyzing part 220 adds the first beat signal converted into the frequency data as the real part and the second beat signal converted into the frequency data as the imaginary part, and cancels the image signal. The above-mentioned operation of the detection part 160 is controlled by the control part 50, for example.

At least a part of such a control part 50 and detection part 160 includes, for example, an integrated circuit or the like. In this case, at least a part of the detection part 160 after the beat signals are converted into the digital signals includes the integral circuit or the like. For example, the control part 50 and the detection part 160 include a field programmable gate array (FPGA), a digital signal processor (DSP), and/or a central processing unit (CPU).

When at least a part of the control part 50 and the detection part 160 is formed by a computer or the like, the control part 50 and the detection part 160 include a storage unit. The storage unit includes, for example, a read only memory (ROM) storing a basic input output system (BIOS) or the like of the computer or the like to execute the control part 50 and the frequency analyzing part 220, and a random access memory (RAM) serving as a work area. Also, the storage unit may include an operating system (OS) and various pieces of information including application programs and/or a database to be referred to at the time of executing the application programs. That is, the storage unit may include a large-capacity storage device like a hard disk drive (HDD) and/or a solid state drive (SSD).

The computer or the like includes a processor such as the CPU or the like and functions as the control part 50 and the frequency analyzing part 220 by executing the programs stored in the storage unit. The computer or the like may include a graphics processing unit (GPU) or the like.

[Outline of the Quadrature Detection]

Figure 8:
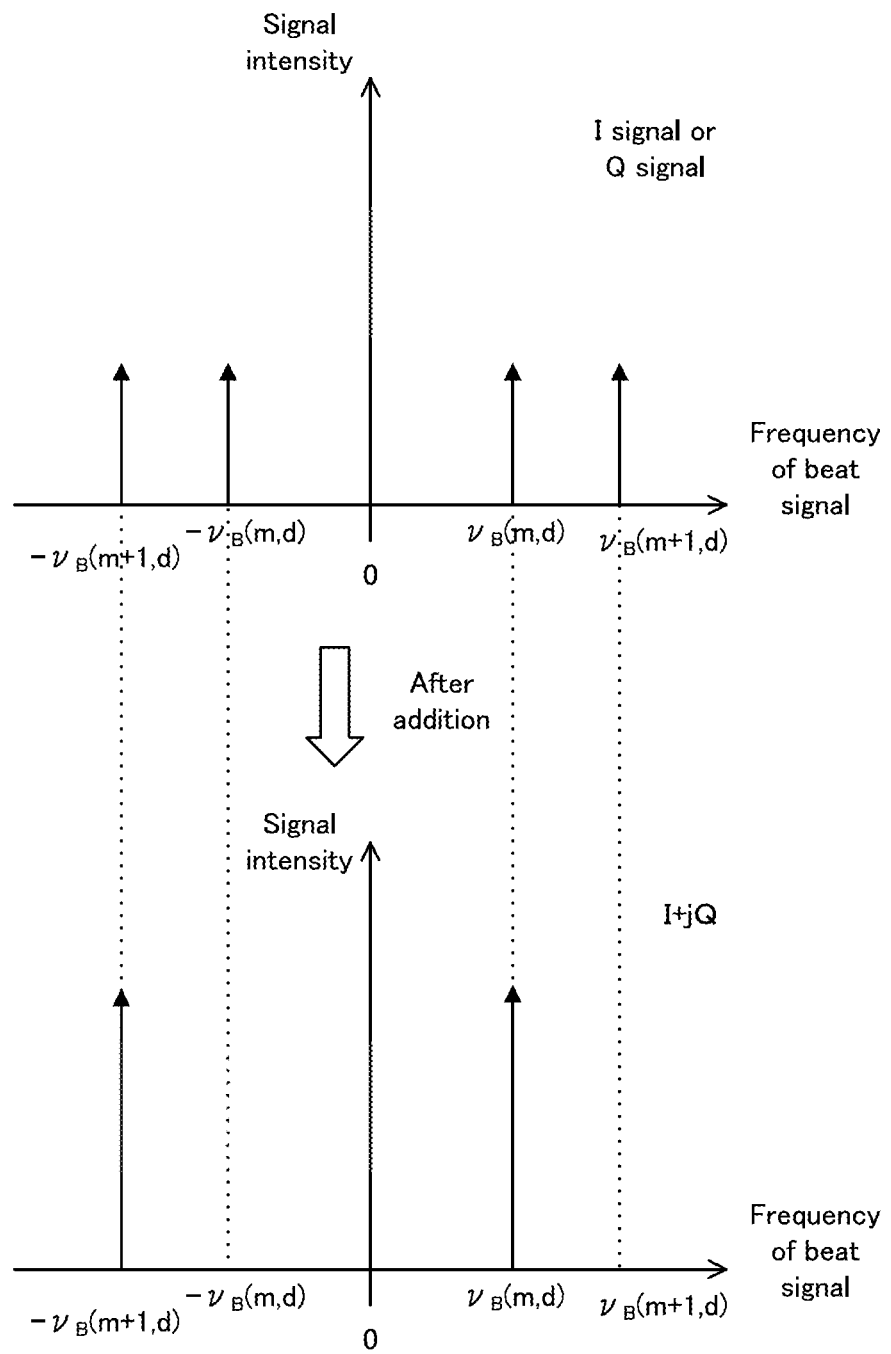
FIG. 8 shows an example of an outline of a quadrature detection by the beat signal generation part 150 and the detection part 160 according to the present embodiment.

FIG. 8 shows an example of an outline of the quadrature detection by the beat signal generation part 150 and the detection part 160 according to the present embodiment. In FIG. 8, the horizontal axis indicates the frequency of the beat signal, and the vertical axis indicates the signal intensity. FIG. 8 shows a frequency spectrum of one of the I signal and the Q signal. The frequency spectra of both the I and Q signals have approximately the same spectral shape, as shown in the upper part of FIG. 8. In the I signal I and the Q signal, for example, a beat signal $v_B(m, d)$ and an image signal $v_B(m+1, d)$ are observed in a frequency band between the frequencies 0 and $v_c$. In this case, in the i and Q signals, a beat signal $-v_B(m, d)$ and an original beat signal $-v_B(m+1, d)$ of the image signal exist in a frequency band between the frequencies 0 and $-v_c$ on the negative side.

Here, since the I signal and the Q signal are signal components being quadrature-detected by the beat signal generation part 150, they include different phase information even if the spectral shapes are the same. For example, in the frequency band between the frequencies 0 and $v_c$ on the positive side, phases of the image signal $v_B(m+1, d)$ of the I signal and the image signal $v_B(m+1, d)$ of the Q signal are mutually inverted. Similarly, in the frequency band between the frequencies 0 and $-v_c$ on the negative side, phases of the beat signal $-v_B(m, d)$ of the I signal and the beat signal $-v_B(m, d)$ of the Q signal are mutually inverted.

Therefore, as shown in the lower part of FIG. 8, when the frequency analyzing part 220 calculates I+jQ using the I signal and the Q signal, the beat signals of the frequency $v_B(m, d)$ strengthen each other and the image signals of the frequency $v_B(m+1, d)$ cancel each other out in the frequency band between the frequencies 0 and $v_c$. Similarly, in the frequency band between the frequencies 0 and $-v_c$, two beat signals of the frequency $-v_B(m+1, d)$ strengthen each other and two beat signals of the frequency $-v_B(m, d)$ cancel each other out.

According to the frequency analysis result of the frequency analyzing part 220, one beat signal is observed for the frequency $v_B(m, d)$ in the frequency band between the frequencies 0 and $v_c$. Since the measurement apparatus 100 can cancel out the image signal in this manner, the distance d between the optical head part 140 and the object to be measured 10 can be measured.

As described above, according to the measurement apparatus 100 of the present embodiment, the distance d between the measurement apparatus 100 and the object to be measured 10 can be measured in a non-destructive and non-contact manner.

Such a measurement apparatus 100 that measures the distance d to the object to be measured 10 in the non-contact manner is often located independently of the object to be measured 10. Therefore, when at least one of the measurement apparatus 100 or the object to be measured 10 is oscillating or moving, a relative velocity is generated between the measurement apparatus 100 and the object to be measured 10. Such a relative velocity may affect a measurement result of the measurement apparatus 100 as an error.

For example, when a component of the relative velocity in a direction parallel to an optical axis direction of the measurement light of the measurement apparatus 100 has a finite value, a frequency shift corresponding to the component of the relative velocity occurs, due to the Doppler effect, in the reflected light from the object to be measured 10. The frequency shift of the reflected light causes an error in the measurement result of the measurement apparatus 100 because the frequency shift of the reflected light causes the frequency of the beat signal generated by the beat signal generation part 150 to fluctuate.

Therefore, to reduce such an error due to the Doppler effect, the measurement apparatus 100 according to the present embodiment changes the frequency shift direction of the laser apparatus 110 and performs a frequency analysis on beat signals before and after the changing of the shift direction. Next, a measurement operation of the measurement apparatus 100 will be described.

[First Example of an Operation Flow of the Measurement Apparatus 100]

Figure 9:
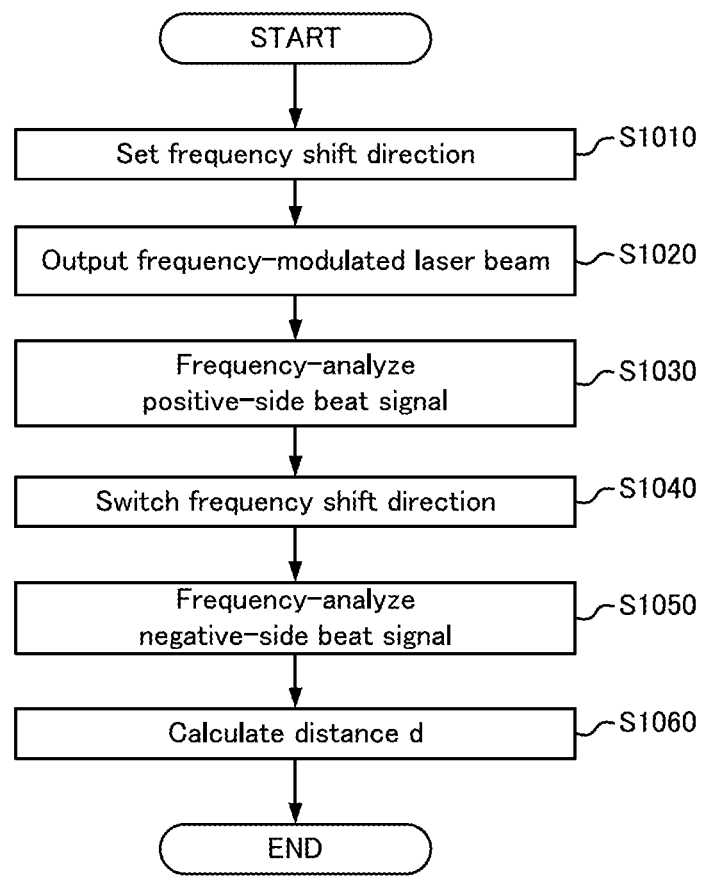
FIG. 9 shows a first example of an operation flow of the measurement apparatus 100 according to the present embodiment.

FIG. 9 shows a first example of an operation flow of the measurement apparatus 100 according to the present embodiment. The measurement apparatus 100 measures the distance d between the optical head part 140 and the object to be measured 10 by executing operations from S1010 to S1060 of FIG. 9.

First, in S1010, the control part 50 sets the frequency shift direction of the optical SSB modulator 30 to one of the positive side or the negative side. For example, the control part 50 sets the frequency shift direction of the optical SSB modulator 30 to the positive side. Also, the control part 50 may further set the frequency shift amount $v_s$ of the optical SSB modulator 30.

Next, in S1020, the control part 50 controls the laser apparatus 110 having the gain medium 114 and the optical SSB modulator 30 in the optical cavity to output a frequency-modulated laser beam with a plurality of modes. Then, branching part 120 branches the frequency-modulated laser beam output from the laser apparatus 110, with a portion of it as a reference light and at least some of the remaining portion of it as a measurement light. The optical head part 140 radiates the measurement light to the object to be measured 10. Then, the optical head part 140 receives a reflected light reflected from the object to be measured 10. The beat signal generation part 150 mixes the reflected light and reference light to generate a positive-side beat signal.

Next, in S1030, the control part 50 controls the detection part 160 to cause the detection part 160 to frequency-analyze the positive-side beat signal. The detection part 160, for example, samples the positive-side beat signal at a sampling frequency greater than or equal to twice the cavity frequency of the optical cavity to generate sampling data. The frequency analyzing part 220 calculates I+jQ by frequency-converting an I signal and a Q signal of the sampling data. The frequency analyzing part 220 calculates a positive-side frequency $F_1$ at which the positive-side beat signal is generated.

Next, in S1040, the control part 50 switches the frequency shift direction of the optical SSB modulator 30 to the opposite direction. For example, the control part 50 switches the frequency shift direction of the optical SSB modulator 30 from the positive side to the negative side. The branching part 120 branches the frequency-modulated laser beam whose frequency shift direction has been switched, with a portion of it as a reference light and at least some of the remaining portion of it as a measurement light. The optical head part 140 radiates the measurement light to the object to be measured 10. The optical head part 140 receives a reflected light reflected from the object to be measured 10. The beat signal generation part 150 mixes the reflected light and the reference light to generate a negative-side beat signal.

Next, in S1050, the control part 50 switches the frequency shift direction of the optical SSB modulator 30 and then controls the detection part 160 to frequency-analyze the negative-side beat signal. For example, the detection part 160 calculates, in a similar manner as with the positive-side beat signal, a negative-side frequency $F_2$ at which the negative-side beat signal is generated.

Next, in S1060, the frequency analyzing part 220 detects the difference in the propagation distance between the reference light and the measurement light, i.e., the distance d, based on results of the frequency analysis of the positive-side beat signal and the negative-side beat signal. Here, if the Doppler effect corresponding to the relative velocity between the measurement apparatus 100 and the object to be measured 10 occurs, the frequency analysis results of the positive-side beat signal and the negative-side beat signal include an error.

For example, supposing that the frequency error due to the Doppler effect is ΔF, the positive-side frequency $F_1$ of the positive-side beat signal can be expressed as $F_0-\Delta F$. Here, $F_0$ is the frequency of the positive-side beat signal which is observed when the Doppler effect does not occur. Also, the negative-side frequency $F_2$ of the negative-side beat signal can be expressed as $F_0+\Delta F$, since the positive and negative signs of the error due to the Doppler effect are inverted because the frequency shift direction of the optical SSB modulator 30 is switched to the opposite side. Concepts of such positive-side frequency $F_1$ and negative-side frequency $F_2$ will be described with reference to FIG. 10.

Figure 10:
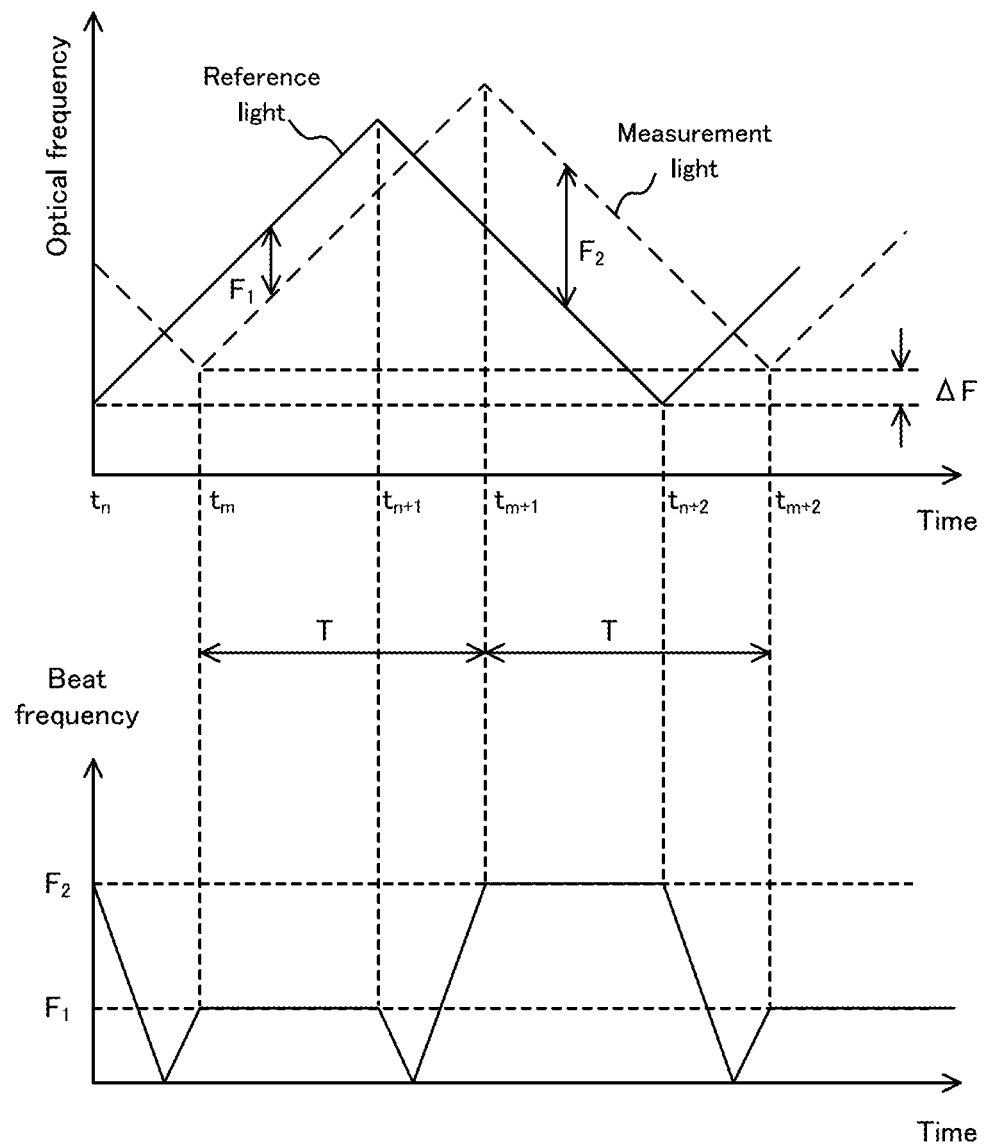
FIG. 10 shows concepts of (i) optical frequencies of a reference light and a measurement light and (ii) a frequency of a beat signal to be observed of the measurement apparatus 100 according to the present embodiment.

FIG. 10 shows concepts of (i) optical frequencies of the reference light and the measurement light and (ii) a frequency of the observed beat signal of the measurement apparatus 100 according to the present embodiment. In the upper part of FIG. 10, the horizontal axis indicates the time and the vertical axis indicates the optical frequencies of the reference light and the measurement light. In the lower part of FIG. 10, the horizontal axis indicates the time and the vertical axis indicates the frequency of the beat signal. FIG. 10 shows an example in which the control part 50 repeats the switching of the frequency shift direction of the optical SSB modulator 30 at a constant period T.

For example, the reference light that reached the beat signal generation part 150 in a period from the time $t_n$ to the time $t_{n+1}$ is a portion of the laser beam output from the laser apparatus 110 during a period in which the frequency shift direction of the optical SSB modulator 30 is set to the positive side. Also, the measurement light, which is branched during the period in which the frequency shift direction of the optical SSB modulator 30 is set to the positive side, reaches the beat signal generation part 150 during a period from the time $t_m$, delayed by a certain amount of time, to the time $t_{m+1}$.

If there is no impact from the Doppler effect, a delay time of the measurement light with respect to the reference light corresponds to the distance d to the object to be measured 10, and the frequency of the beat signals generated by the beat signal generation part 150 is $F_0$. FIG. 10 shows an example in which an error ΔF due to the Doppler effect occurs, and the positive-side frequency $F_1$ of the positive-side beat signal generated by the beat signal generation part 150 during the period from the time $t_m$ to the time $t_{n+1}$ is expressed as $F_0-\Delta F$.

Similarly, the reference light that reached the beat signal generation part 150 in a period from the time $t_{n+1}$ to the time $t_{n+2}$ is a portion of the laser beam output from the laser apparatus 110 during a period in which the frequency shift direction of the optical SSB modulator 30 is set to the negative side. Also, the measurement light, which is branched during the period in which the frequency shift direction of the optical SSB modulator 30 is set to the negative side, reaches the beat signal generation part 150 during a period from the time $t_{m+1}$, delayed by a certain amount of time, to the time $t_{m+2}$.

Here, since the error due to the Doppler effect shifts the frequency of the measurement light, a waveform of the measurement light is shifted in a vertical direction in the upper part of FIG. 10. In this case, the delay time of the measurement light with respect to the reference light varies depending on the shift direction. For example, the negative-side frequency $F_2$ of the negative-side beat signal generated by the beat signal generation part 150 during the period from the time $t_{m+1}$ to the time $t_{m+2}$ is $F_0+\Delta F$.

Therefore, if the frequency analyzing part 220 calculates, as an example, a mean value of the positive-side frequency $F_1$ and the negative-side frequency $F_2$, ideally, it is possible to obtain a value of the frequency $F_0$ of the beat signals that are generated when there is no impact from the Doppler effect. By doing this, the frequency analyzing part 220 can calculate the distance d between the optical head part 140 and the object to be measured 10 using Equation 6. The display part 170 displays a value of the calculated distance d.

As described above, the detection part 160 can detect the difference in the propagation distance between the reference light and the measurement light with the reduced impact of the Doppler effect on the basis of the results of frequency analysis of (i) the positive-side beat signal generated when the frequency shift direction of the optical SSB modulator 30 is set to the positive side and (ii) the negative-side beat signal generated when the frequency shift direction of the optical SSB modulator 30 is set to the negative side. It should be noted that the measurement apparatus 100 may measure a geometry of the object to be measured 10 by changing a position where the frequency-modulated laser beam is radiated onto the object to be measured 10 and repeating the operation flow shown in FIG. 9.

The measurement apparatus 100 according to the present embodiment described above can reduce the impact of the Doppler effect and accurately measure the distance d to the object to be measured 10 by using the laser apparatus 110 having the optical SSB modulator 30. Here, from Equation 6, the greater the values of $v_s$ and $v_c$, the smaller the effect of the measurement accuracy of the signal frequency $v_B$(m, d) of the beat signal on the measurement accuracy of the distance d. The value of $v_c$ can be increased by shortening a cavity length of the laser apparatus 110, however the value of $v_c$ cannot be easily increased because there are limits to a length of the gain medium 114 required for laser oscillation, a length required for handling fibers, and the like.

When the AOFS 20 is used as the frequency shifter 112, the maximum value of the frequency shift amount by the optical crystal 21 is about 1.5 GHz, and in terms of efficiency or the like, the shift amount is typically about several hundred MHz. Further, since the ultrasonic transducer 22 has cavity frequencies, there are limits on making the frequency shift amount variable and using it.

In contrast, since the optical SSB modulator 30 is used in the measurement apparatus 100 according to the present embodiment, it is possible to set the frequency shift amount $v_s$ to be about several tens of times greater than the case where the AOFS 20 is used. Therefore, the measurement apparatus 100 can improve the sensitivity of the beat frequency to the change in the distance d to several tens of times more than before, and can measure the distance d to the object to be measured 10 with high accuracy.

Further, since the measurement apparatus 100 according to the present embodiment can change the frequency shift amount of the FSFL, it can easily determine the order m of the beat signal, for example. As described in Equation 6, the order m can be determined by detecting a change in the beat signal when the frequency shift amount $v_s$ of the laser apparatus 110 is changed.

Such a method of determining the order m is known, as described in Patent Document 1 or the like, as a method of detecting a beat signal for each different frequency shift amount, simultaneously formulating relational expressions of Equation 5, and calculating the order m as a solution of the simultaneous equations. The measurement apparatus 100 may determine the order m by using such a method by changing the frequency shift amount of the FSFL.

It should be noted that when the order m is changed according to the change in the frequency shift amount, the number of solutions of the equations to be simultaneously established is increased, and correspondingly the number of equations to be simultaneously established must be increased. The value of the order m can be expressed, by the following equation, as a quotient of the distance d divided by an absolute length measurement range. Here, the absolute length measurement range is a range in which the distance d can be continuously measured without changing the value of the order m, and is a distance (i.e., $c/2v_s$) in which the measurement light travels back and forth within the time of the reciprocal of the shift frequency $v_s$. Also, floor( ) is truncation of any fractional part.

$$m = \text{floor}\left(\frac{2dv_s}{c}\right) \qquad \text{[Equation 7]}$$

Here, by differentiating Equation 7 with respect to $v_s$ the following equation is obtained.

$$\frac{\partial m}{\partial v_s} = \frac{2d}{c} \qquad \text{[Equation 8]}$$

From Equation 8, it can be seen that the greater the value of the distance d, the greater the change amount of the value of the order m with respect to the change of the frequency shift amount $v_s$. This means that the farther the distance d from the laser apparatus 110 to the object to be measured 10 is, the more the order m changes due to the frequency shift. Also, when the frequency shift amount $v_s$ is increased in the above-mentioned manner, on one hand the measurement accuracy of the distance d is improved, but on the other hand the absolute length measurement range is narrowed and the order m is easily changed. Therefore, there may be some cases where measuring an object to be measured 10 at a farther distance with accuracy with the measurement apparatus 100 is difficult, since the value of m changes more and the simultaneous equations become complicated.

Therefore, the measurement apparatus 100 according to the present embodiment makes it possible to measure the distance d at a greater distance with higher sensitivity by making the frequency shift amount for determining the order m differ from the frequency shift amount for measuring the distance d. Next, a measurement operation of such a measurement apparatus 100 will be described.

[Second Example of the Operation Flow of the Measurement Apparatus 100]

Figure 11:
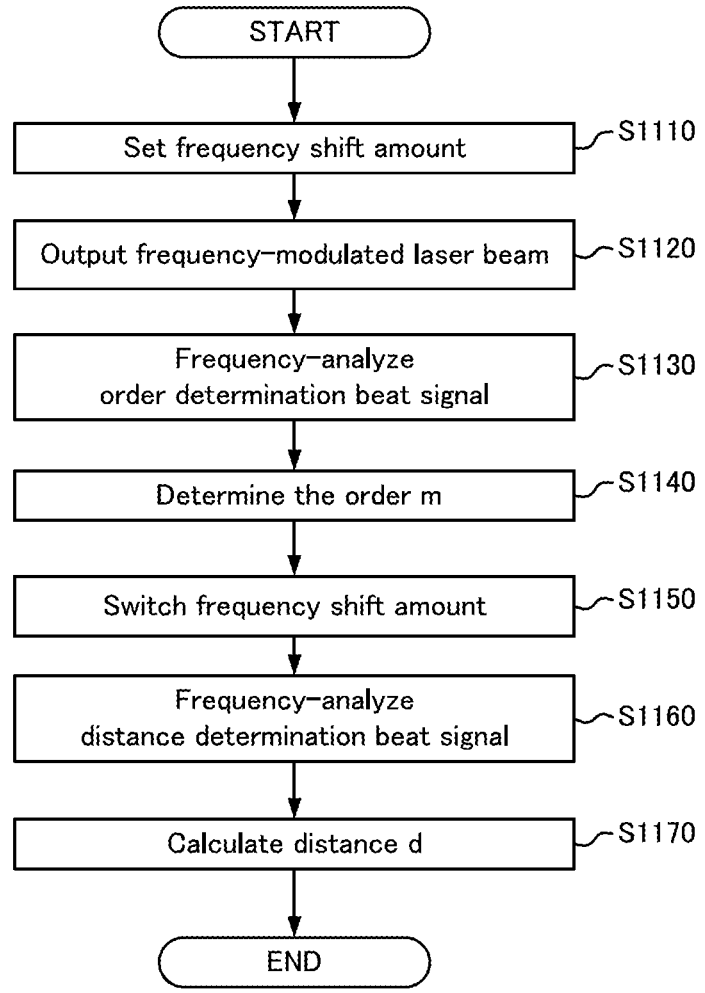
FIG. 11 shows a second example of the operation flow of the measurement apparatus 100 according to the present embodiment.

FIG. 11 shows a second example of the operation flow of the measurement apparatus 100 according to the present embodiment. In the operation flow of the second example, the descriptions of some of the operations already described in the operation flow of the first example are omitted.

First, in S1110, the control part 50 sets the frequency shift amount $v_s$ of the optical SSB modulator 30 to a first frequency $v_{s1}$. The first frequency $v_{s1}$ is the frequency shift amount for determining the order m, and is smaller than the frequency shift amount for measuring the distance d. The first frequency $v_{s1}$ is preferably a low frequency for expanding the absolute length measurement range for measuring the distance d to a range of about several times or more. Further, it is more preferable that the first frequency $v_{s1}$ is a frequency corresponding to the distance d, as will be described below. The first frequency $v_{s1}$ is, for example, a frequency of approximately several tens of MHz to several GHz. The control part 50 may also further set the frequency shift direction of the optical SSB modulator 30.

Next, in S1120, the control part 50 controls the laser apparatus 110 having the gain medium 114 and the optical SSB modulator 30 in the optical cavity to output a frequency-modulated laser beam with a plurality of modes. The branching part 120 branches the frequency-modulated laser beam output from the laser apparatus 110, with a portion of it as a reference light and at least some of the remaining portion of it as a measurement light. The optical head part 140 radiates the measurement light to the object to be measured 10. Then, the optical head part 140 receives a reflected light reflected from the object to be measured 10. The beat signal generation part 150 mixes the reflected light and the reference light to generate an order determination beat signal.

Next, in SI 130, the control part 50 controls the detection part 160 to cause the detection part 160 to frequency-analyze the order determination beat signal. The frequency analyzing part 220 calculates a frequency $F_3$ for order determination at which order determination beat signals are generated.

Next, in S1140, the frequency analyzing part 220 determines the order m using the frequency $F_3$ for order determination and Equation 5. The frequency analyzing part 220 determines the order m in the absolute length measurement range for measuring the distance d. A relationship between the frequency shift amount $v_s$ and the absolute length measurement range will be described with reference to FIG. 12.

Figure 12:
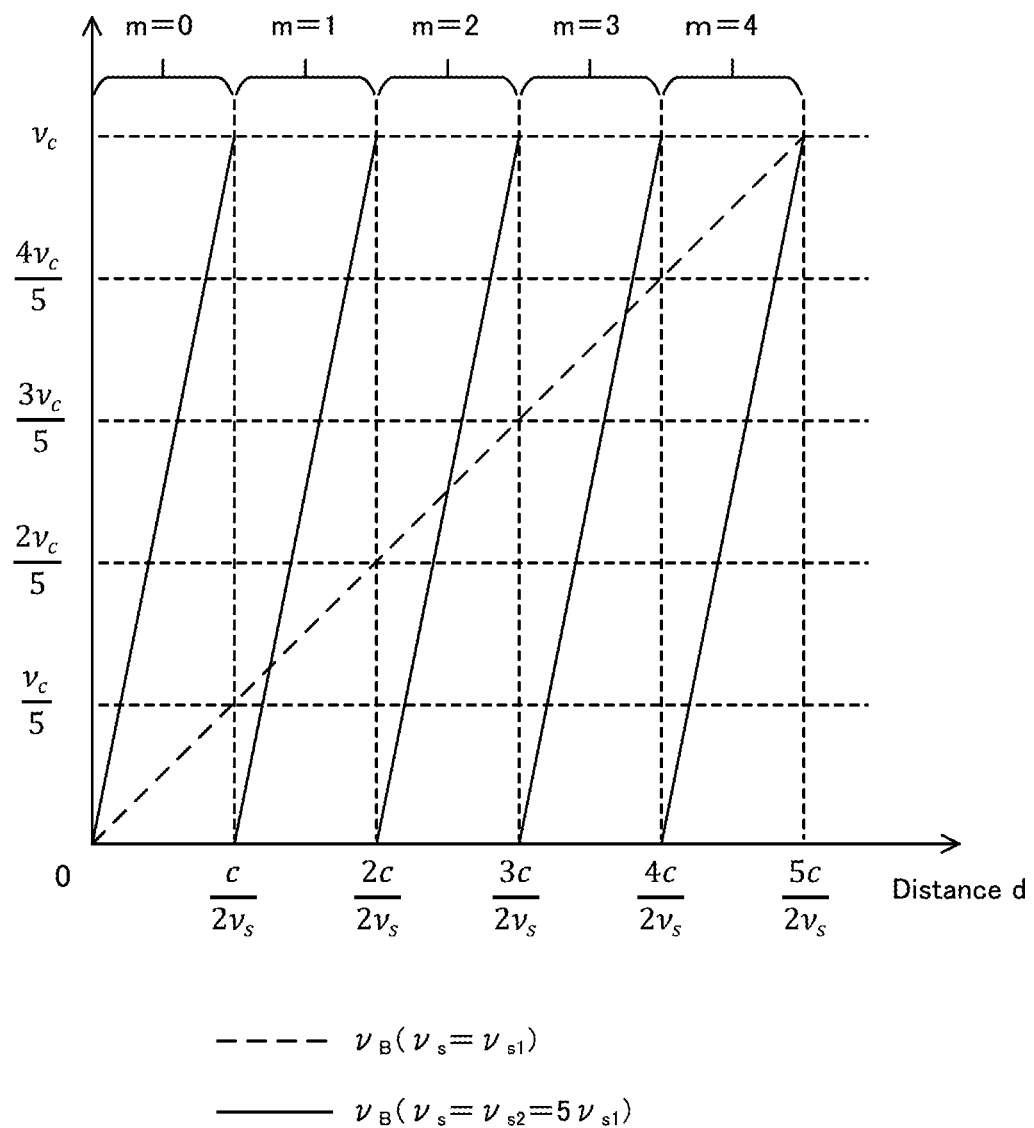
FIG. 12 shows a concept of a relationship between a frequency shift amount $v_s$ and an absolute length measurement range of the laser apparatus 110 according to the present embodiment.

FIG. 12 shows a concept of the relationship between the frequency shift amount $v_s$ and the absolute length measurement range of the laser apparatus 110 according to the present embodiment. The horizontal axis of FIG. 12 indicates the distance d to the object to be measured 10, and the vertical axis indicates the frequency of the beat signal.

A plurality of straight lines shown by solid lines in FIG. 12 are graphs showing the relation of the frequency $v_B(m, d)$ of the beat signal with respect to the distance d for each of the plurality of m, as described in FIG. 6. That is, the plurality of straight lines shown by solid lines indicate the relation between the distance d and the frequency $v_B(m, d)$ when a frequency shift amount $v_{s2}$ for measuring the distance d by the control part 50 is set for the laser apparatus 110. The frequency shift amount $v_{s2}$ in this case is set as a second frequency. The absolute length measurement range is calculated as $c/2v_s = c/2v_{s2}$.

A straight line represented by a dotted line of FIG. 12 shows the relation between the distance d and the frequency $v_B(m, d)$ when the frequency shift amount $v_s$ is set to the first frequency $v_{s1}$. FIG. 12 shows an example in which the first frequency $v_{s1}$ is $v_{s2}/5$. It can be seen that the absolute length measurement range has been expanded to $5c/2v_{s2}$. Therefore, when the order determination beat signals of the frequencies in the range from 0 to $v_c$ are determined by setting the frequency shift amount vs to the first frequency $v_{s1}$, it is possible to detect the frequency $F_3$ for order determination corresponding to the distance d without a change of the order m.

As an example, suppose that the detection part 160 detects and frequency-analyzes the order determination beat signals to calculate the frequency $F_3$. In this case, since the frequency of the order determination beat signals is within the range of the absolute length measurement range, it is possible to calculate a distance $d_3$ corresponding to the frequency $F_3$. Then, on the basis of the calculated distance $d_3$, it is possible to determine the order m for when the frequency shift amount is set to the second frequency $v_s$. For example, from the plurality of straight lines indicated by solid lines in FIG. 12, it can be seen that an absolute length measurement range in which the distance $d_3$ can be measured is the order m=3, and beat signals indicated by straight lines of other orders are replicas. As described above, it is possible to determine the order m for when the distance d is measured by expanding the absolute length measurement range by setting the first frequency $v_{s1}$ to a lower frequency. The first frequency $v_{s1}$ is preferably set to a frequency such that a frequency corresponding to the distance d to the object to be measured 10 is included in the expanded absolute length measurement range.

Next, in S1150, the control part 50 switches the frequency shift amount $v_s$ of the optical SSB modulator 30 to the second frequency $v_{s2}$ which is larger than the first frequency $v_{s1}$. The second frequency $v_{s2}$ is the frequency shift amount for measuring the distance d, as described above. The branching part 120 branches the frequency-modulated laser beam whose frequency shift amount has been switched, with a portion of it as a reference light and at least some of the remaining portion of it as a measurement light. The optical head part 140 radiates the measurement light to the object to be measured 10. The optical head part 140 receives a reflected light reflected from the object to be measured 10. The beat signal generation part 150 mixes the reflected light and reference light to generate a distance measurement beat signal.

Next, in S1160, the control part 50 switches the frequency shift amount of the optical SSB modulator 30 and then controls the detection part 160 to frequency-analyze the distance measurement beat signal. The frequency analyzing part 220 calculates a frequency $F_4$ for distance measurement at which distance measurement beat signals are generated.

Next, in S1170, the frequency analyzing part 220 detects a difference in the propagation distance between the reference light and the measurement light based on the results of frequency analysis of the order determination beat signals and the distance measurement beat signals. For example, the frequency analyzing part 220 calculates the distance d by substituting the order m and the frequency $F_4$ for distance determination into Equation 6. The display part 170 displays a value of the calculated distance d.

As described above, the measurement apparatus 100 can easily determine the order m by reducing the frequency shift amount such that it has a resolution sufficient to at least determine the order m. Then, the measurement apparatus 100 measures the distance d after improving the measurement accuracy by switching the frequency shift amount to a higher frequency. This enables the measurement apparatus 100 to measure the distance d at a greater distance with greater sensitivity.

In the operation flow of FIG. 11, an example in which the measurement apparatus 100 detects the distance measurement beat signals after detecting the order determination beat signals has been described, but the present embodiment is not limited to this. The measurement apparatus 100 may detect the distance measurement beat signals before detecting the order determination beat signals. In this manner, the control part 50 may set the frequency shift amount of the optical SSB modulator 30 to one of the first frequency $v_{s1}$ or the second frequency $v_{s2}$ which is larger than the first frequency $v_{s1}$, and then cause the detection part 160 to frequency-analyze the beat signals. The detection part 160 detects a difference in the propagation distance of the reference light and the measurement light based on the results of frequency analysis of (i) the order determination beat signals generated when the frequency shift amount of the optical SSB modulator 30 is set to the first frequency $v_{s1}$ and (ii) the distance measurement beat signals generated when the frequency shift amount of the optical SSB modulator 30 is set to the second frequency $v_{s2}$.

In the measurement apparatus 100 according to the present embodiment described above, the operation of reducing the impact of the Doppler effect and the operation of determining the order m have been described separately, but the present embodiment is not limited to this. The measurement apparatus 100 may determine the order m while reducing the impact of the Doppler effect. Next, the operation of such a measurement apparatus 100 will be described.

[Third Example of the Operation Flow of the Measurement Apparatus 100]

Figure 13:
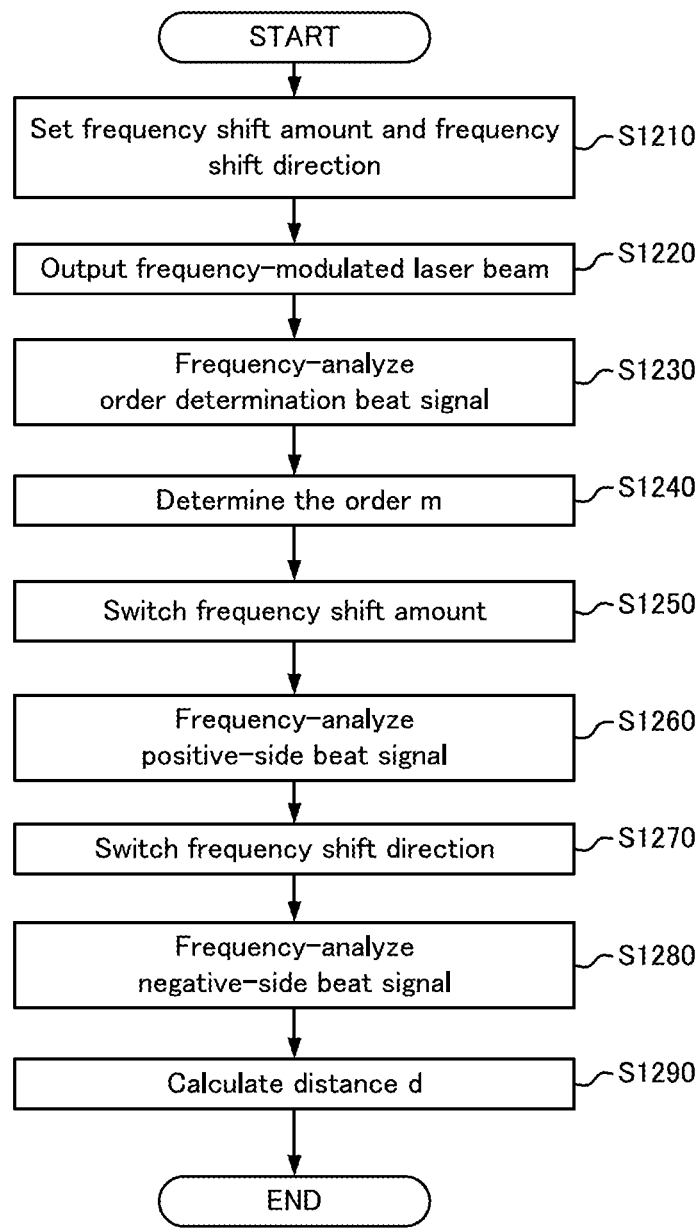
FIG. 13 shows a third example of the operation flow of the measurement apparatus 100 according to the present embodiment.

FIG. 13 shows a third example of the operation flow of the measurement apparatus 100 according to the present embodiment. In the operation flow of the third example, the descriptions of some of the operations already described in the operation flow of the first example and the operation flow of the second example are omitted.

First, in S1210, the control part 50 sets the frequency shift amount of the optical SSB modulator 30 to the first frequency $v_{s1}$, and sets the frequency shift direction to one of the positive side or the negative side. For example, the control part 50 sets the first frequency to v/5 and the frequency shift direction to positive.

Next, in S1220, the control part 50 controls the laser apparatus 110 and outputs a frequency-modulated laser beam with a plurality of modes. The branching part 120 branches the frequency-modulated laser beam output from the laser apparatus 110, with a portion of it as a reference light and at least some of the remaining portion of it as a measurement light. The optical head part 140 radiates the measurement light to the object to be measured 10. Then, the optical head part 140 receives a reflected light reflected from object to be measured 10. The beat signal generation part 150 mixes the reflected light and reference light to generate an order determination beat signal.

Next, in S1230, the control part 50 controls the detection part 160 to cause the detection part 160 to frequency-analyze the order determination beat signal. The frequency analyzing part 220 calculates a frequency $F_0$ for order determination at which order determination beat signals are generated.

Next, in S1240, the frequency analyzing part 220 determines the order m using the frequency $F_0$ for order determination and Equation 5. At this stage, the frequency $F_0$ calculated on the basis of the order determination beat signals may include an error due to the impact of the Doppler effect. However, the error due to the impact of the Doppler effect is a small error to the extent that it has little effect on the determination of the order m, and is not a problem here.

Next, in S1250, the control part 50 switches the frequency shift amount of the optical SSB modulator 30 to a second frequency, which is larger than the first frequency, to generate a positive-side beat signal. Here, the control part 50 does not change the frequency-shift direction of the optical SSB modulator 30.

Next, in S1260, the control part 50 controls the detection part 160 to frequency-analyze the positive-side beat signal. The frequency analyzing part 220 calculates the positive-side frequency $F_1$ at which positive-side beat signals are generated by using the frequency analysis result. Also in this stage, the positive-side frequency $F_1$ calculated on the basis of the positive-side beat signals may include an error due to the impact of the Doppler effect.

Next, in S1270, the control part 50 switches the frequency shift direction to the opposite direction while the frequency shift amount of the optical SSB modulator 30 is kept at the second frequency to generate the negative-side beat signals. For example, the control part 50 switches the frequency-shift direction of the optical SSB modulator 30 from the positive side to the negative side. The branching part 120 branches the frequency-modulated laser beam whose frequency shift direction is switched, with a portion of it as a reference light and at least some of the remaining portion of it as a measurement light. The optical head part 140 radiates the measurement light to the object to be measured 10. The optical head part 140 receives a reflected light reflected from the object to be measured 10. The beat signal generation part 150 mixes the reflected light and the reference light to generate the negative-side beat signals.

Next, in S1280, the control part 50 controls the detection part 160 to frequency-analyze the negative-side beat signals. The frequency analyzing part 220 calculates the negative-side frequency $F_2$ at which the negative-side beat signals are generated using the frequency analysis result. Also in this stage, the negative-side frequency $F_2$ calculated on the basis of the negative-side beat signals may include an error due to the impact of the Doppler effect. In this case, in comparison to the error included in the positive-side frequency $F_1$, the error included in the negative-side frequency $F_2$ has approximately the same value with the sign inverted.

Next, in S1290, the frequency analyzing part 220 detects a difference in the propagation distance between the reference light and the measurement light based on the results of frequency analysis of (i) the order determination beat signals, (ii) the positive-side beat signals, and (iii) the negative-side beat signals. The frequency analyzing part 220 calculates, for example, the mean value of the positive frequency $F_1$ and the negative frequency $F_2$. By doing this, the frequency analyzing part 220 calculates the distance d between the optical head part 140 and the object to be measured 10 by substituting the mean value and the order m into Equation 6. The display part 170 displays a value of the calculated distance d.

As described above, since the measurement apparatus 100 according to the present embodiment is provided with the laser apparatus 110 which can easily change the frequency shift amount and the frequency shift direction, the measurement apparatus 100 can measure the distance d to the object to be measured 10 with high accuracy by determining the order m while reducing the impact of the Doppler effect.

[Variation Example of the Control Part 50]

In the measurement apparatus 100 according to the present embodiment described above, an example in which the laser apparatus 110 has the optical SSB modulator 30, and the frequency shift direction of the optical SSB modulator 30 can be switchable by switching the voltage supplied to the optical SSB modulator 30 has been described, but the present embodiment is not limited to this. For example, the measurement apparatus 100 may be capable of switching the frequency shift direction of the optical SSB modulator 30 by inverting a phase of the RF signal that drives the optical SSB modulator 30. Next, the optical SSB modulator 30 and the control part 50 of such a measurement apparatus 100 will be described.

Figure 14:
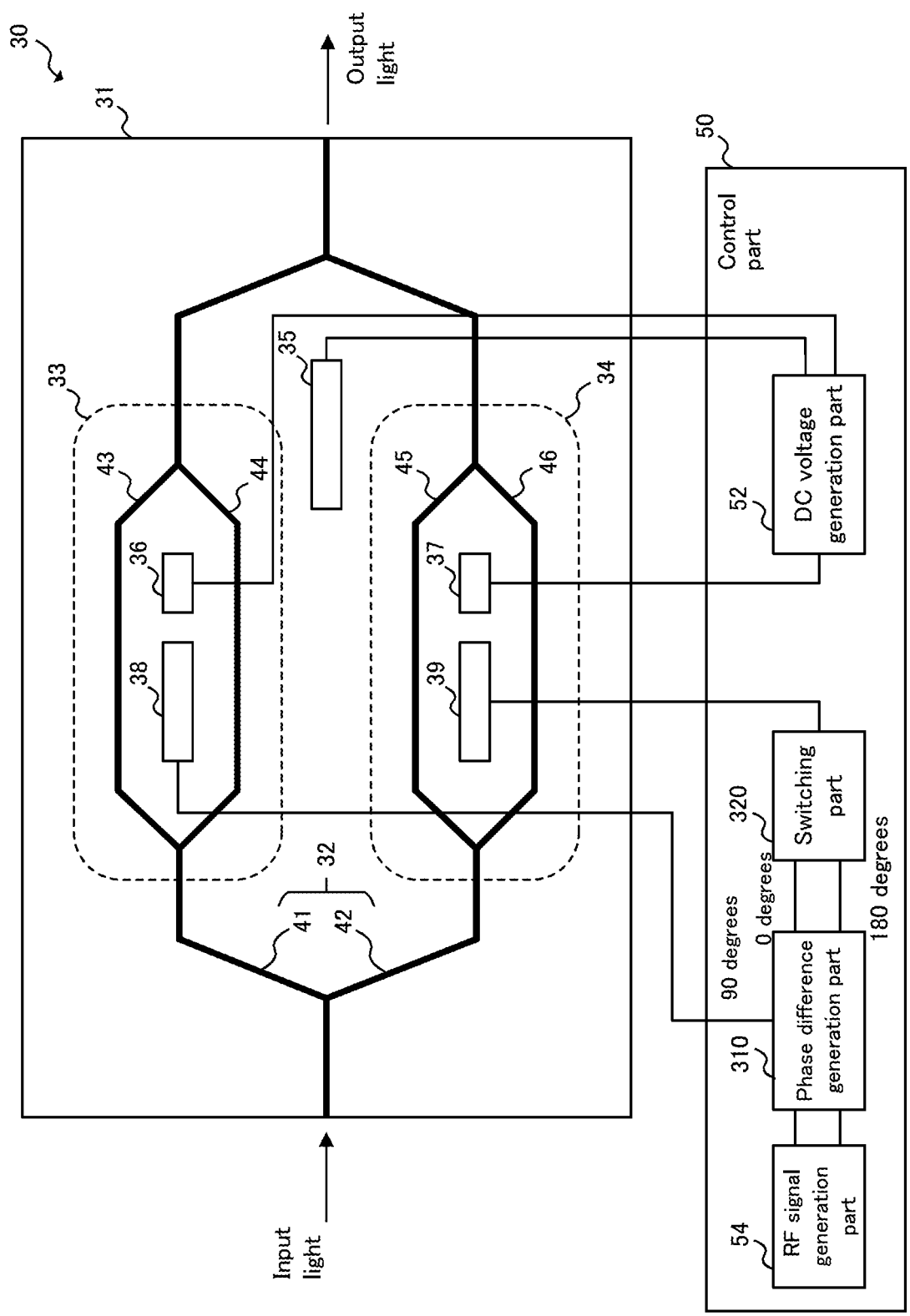
FIG. 14 shows a variation example of the control part 50 according to the present embodiment together with the optical SSB modulator.

FIG. 14 shows a variation example of the control part 50 according to the present embodiment together with the optical SSB modulator 30. In the control part 50 of the optical SSB modulator 30 shown in FIG. 14, the operations approximately the same as those of the optical SSB modulator 30 and the control part 50 according to the present embodiment shown in FIG. 3 are denoted by the same reference numerals, and the descriptions thereof are omitted. The control part 50 of the variation example further includes a phase difference generation part 310 and a switching part 320.

In the control part 50 of the variation example, the RF signal generation part 54 generates a plurality of RF signals. The RF signal generation part 54, for example, generates two RF signals whose phases and frequencies approximately match. For example, the RF signal generation part 54 may branch one RF signal into two. The RF signal generation part 54 supplies the plurality of generated RF signals to the phase difference generation part 310.

The phase difference generation part 310 causes phases of the plurality of input RF signals to be different and outputs a plurality of RF signals, every two outputted RF signals having a predetermined phase difference. For example, the phase difference generation part 310 outputs two input RF signals of the same phase as three RF signals each having a phase difference of approximately 90 degrees. For example, when a phase of the first RF signal among the three RF signals, which are output form the phase difference generation part 310, is 0 degrees, a phase of the second RF signal differs approximately 90 degrees with respect to the first RF signal, and a phase of the third RF signal differs approximately 180 degrees with respect to the first RF signal.

The phase difference generation part 310 causes, for example, a phase of one of the two input RF signals to differ by 90 degrees. Also, the phase difference generation part 310 generates an RF signal whose phase differs by 180 degrees with respect to the other RF signal of the two input RF signals. In other words, the phase difference generation part 310 generates three RF signals including one RF signal (as an example, the second RF signal described above) and two RF signals (as an example, the first and third RF signals described above) whose phases differ by ±90 degrees with respect to the one RF signal.

Alternatively, the RF signal generation part 54 may generate three RF signals whose phases and frequencies approximately match each other and supply them to the phase difference generation part 310. In this case, the phase difference generation part 310 may cause a phase of one of the three input RF signals to differ by 90 degrees, and may cause a phase of one of the remaining two RF signals to differ by 180 degrees.

The phase difference generation part 310 supplies, among the three RF signals, the one RF signal having a phase difference of 90 degrees from each of the other two RF signals to the first RF electrode 38 or the second RF electrode 39. Then, the phase difference generation part 310 supplies the remaining two RF signals to the switching part 320. FIG. 14 shows an example in which the phase difference generation part 310 supplies the second RF signal to the first RF electrode 38, and supplies the first RF signal and the third RF signal to the switching part 320.

The switching part 320 supplies one of the two input RF signals to whichever one of the first RF electrode 38 and the second RF electrode 39 the phase difference generation part 310 has not supplied the RF signal to. FIG. 14 shows an example in which one of the two RF signals to be input to the switching part 320 is input to the second RF electrode 39.

By doing this, a phase difference between the two RF signals respectively supplied to the first RF electrode 38 and the second RF electrode 39 becomes +90 degrees or −90 degrees. Further, the phase difference of the two RF signals can be switched by the control part 50 controlling the switching part 320. The control part 50 inverts the positive and negative signs of the phase difference of the RF signals supplied to the first RF electrode 38 and the second RF electrode 39 in this manner, and therefore the frequency shift direction of the optical SSB modulator 30 can be switched. That is, the control part 50 can switch the frequency shift direction of the optical SSB modulator 30 by switching the phase of the RF signals supplied to the optical SSB modulator 30.

As described above, switching the RF signals supplied to the optical SSB modulator 30 can be realized by a simple circuit configuration such as a switch. Since the control part 50 of such a variation example can be a simple circuit configuration, it is possible to switch the frequency shift direction at low cost, stably, and at high speed.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments. Further, effects of the new embodiment brought by the combinations also have the effect of the original exemplary embodiment together.

What is claimed is:

1. A measurement apparatus comprising:
   a laser apparatus for outputting a frequency-modulated laser beam with a plurality of modes, the laser apparatus including an optical cavity that has a gain medium for amplifying a light to be input, and an optical SSB modulator for shifting a frequency of the light amplified by the gain medium, and control circuitry configured to control the optical SSB modulator to shift a frequency of a light to be input to the optical SSB modulator;
   a branch that branches a portion of the frequency-modulated laser beam output by the laser apparatus as a reference light and at least some of the remaining portion of the frequency-modulated laser beam as a measurement light;
   a beat signal generator that generates a beat signal by mixing the reference light and a reflected light that is reflected by radiating the measurement light onto an object to be measured; and
   a detector that detects a difference in a propagation distance between the reference light and the measurement light by frequency-analyzing the beat signal, wherein
   the detector calculates a difference d in the propagation distance between the reference light and the measurement light with the following equation:

$$d = \frac{c}{2v_s v_c}\{v_B(m, d) + m v_c\}$$

using a frequency vB(m, d) of the beat signal obtained by frequency-analyzing the beat signal, where c is light speed, vS is the frequency shift amount of the frequency-modulated laser beam, vc=1/τRT, τRT is the time for light to go around the optical cavity of the laser apparatus, and m is an interval (difference between the longitudinal mode numbers of the measurement light and the longitudinal mode numbers of the reference light) of the longitudinal mode numbers of the frequency-modulated laser beam.

2. The laser apparatus according to claim 1, wherein the optical SSB modulator has
   a substrate,
   a main Mach-Zehnder waveguide that is provided on the substrate and has a first arm waveguide and a second arm waveguide,
   a first sub Mach-Zehnder waveguide provided on the first arm waveguide, and
   a second sub Mach-Zehnder waveguide provided on the second arm waveguide; and
   the control circuitry is further configured to supply a DC voltage of a predetermined value and an RF signal to an electrode that is provided on the substrate and corresponds to the main Mach-Zehnder waveguide, the first sub Mach-Zehnder waveguide, and the second sub Mach-Zehnder waveguide, and sets the frequency shift amount by changing a frequency of the RF signal.

3. The measurement apparatus according to claim 2, wherein
   the control circuitry is further configured to set the frequency shift amount of the optical SSB modulator to one of a first frequency or a second frequency that is larger than the first frequency, and then causes the detector to frequency-analyze the beat signal, and
   the detector detects a difference in a propagation distance of the reference light and the measurement light based on results of a frequency analysis of (i) an order determination beat signal when the frequency shift amount of the optical SSB modulator is set to the first frequency and (ii) a distance measurement beat signal when the frequency shift amount of the optical SSB modulator is set to the second frequency.

4. The laser apparatus according to claim 1, wherein the optical SSB modulator has
   a substrate,
   a main Mach-Zehnder waveguide that is provided on the substrate and has a first arm waveguide and a second arm waveguide,
   a first sub Mach-Zehnder waveguide provided on the first arm waveguide, and
   a second sub Mach-Zehnder waveguide provided on the second arm waveguide, and
   the control circuitry is configured to switch the frequency shift direction by supplying a DC voltage of a predetermined value to an electrode that is provided on the substrate and corresponds to the main Mach-Zehnder waveguide, the first sub Mach-Zehnder waveguide, and the second sub Mach-Zehnder waveguide.

5. The measurement apparatus according to claim 4, wherein
   the control circuitry is configured to switch the frequency shift direction of the optical SSB modulator to one of a positive side or a negative side, and then causes the detector to frequency-analyze the beat signal, and
   the detector detects a difference in a propagation distance between the reference light and the measurement light based on frequency analysis results of (i) a positive-side beat signal generated when the frequency shift direction of the optical SSB modulator is the positive side and (ii) a negative-side beat signal generated when the frequency shift direction of the optical SSB modulator is the negative side.

6. The laser apparatus according to claim 1, wherein
the optical SSB modulator has
  a substrate,
  a main Mach-Zehnder waveguide that is provided on the substrate and has a first arm waveguide and a second arm waveguide,
  a first sub Mach-Zehnder waveguide provided on the first arm waveguide, and
  a second sub Mach-Zander waveguide provided on the second arm waveguide; and
the control circuitry is configured to invert a phase of an RF signal to be supplied to an electrode that is provided on the substrate and corresponds to the main Mach-Zehnder waveguide, the first sub Mach-Zehnder waveguide, and the second sub Mach-Zehnder waveguide, and switches the frequency shift direction.

7. The measurement apparatus according to claim 6, wherein
the control circuitry is configured to switch the frequency shift direction of the optical SSB modulator to one of a positive side or a negative side, and then causes the detector to frequency-analyze the beat signal, and
the detector detects a difference in a propagation distance between the reference light and the measurement light based on frequency analysis results of (i) a positive-side beat signal generated when the frequency shift direction of the optical SSB modulator is the positive side and (ii) a negative-side beat signal generated when the frequency shift direction of the optical SSB modulator is the negative side.

8. The measurement apparatus according to claim 1, wherein the beat signal generator quadrature-detects the reflected light and the reference light.

9. A measurement method comprising:
  setting a frequency shift amount and a frequency shift direction of an optical SSB modulator;
  outputting a frequency-modulated laser beam with a plurality of modes from a laser apparatus that includes an optical cavity having a gain medium and the optical SSB modulator;
  branching a portion of the frequency-modulated laser beam output by the laser apparatus as a reference light and at least some of the remaining portion of the frequency-modulated laser beam as a measurement light;
  generating a first beat signal by mixing the reference light and a reflected light that is reflected by radiating the measurement light onto an object to be measured; and
  detecting a difference in a propagation distance between the reference light and the measurement light based on a frequency analysis result of the first beat signal,
  wherein the detecting includes calculating a difference d in the propagation distance between the reference light and the measurement light with the following equation:

$$d = \frac{c}{2v_s v_c}\{v_B(m, d) + mv_c\}$$

using a frequency vB(m, d) of the beat signal obtained by frequency-analyzing the beat signal, where c is light speed, vS is the frequency shift amount of the frequency-modulated laser beam, vc=1/τRT, τRT is the time for light to go around the optical cavity of the laser apparatus, and m is an interval (difference between the longitudinal mode numbers of the measurement light and the longitudinal mode numbers of the reference light) of the longitudinal mode numbers of the frequency-modulated laser beam.

10. The measurement method according to claim 9, further comprising:
  generating a second beat signal by switching the frequency shift direction of the optical SSB modulator; and
  detecting a difference in a propagation distance between the reference light and the measurement light based on frequency analysis results of the first beat signal and the second beat signal.

11. The measurement method according to claim 9, wherein
  the setting includes setting the frequency shift amount of the optical SSB modulator to a first frequency, and
  wherein the method further comprises:
  generating a distance measurement beat signal by switching the frequency shift amount of the optical SSB modulator to a second frequency that is larger than the first frequency; and
  detecting a difference in a propagation distance between the reference light and the measurement light based on frequency analysis results of the first beat signal and the distance measurement beat signal.

12. The measurement method according to claim 9, wherein:
  the setting includes setting the frequency shift amount of the optical SSB modulator to a first frequency in the setting, and
  wherein the method further comprises:
  generating a second beat signal by switching the frequency shift amount of the optical SSB modulator to a second frequency that is larger than the first frequency;
  generating a third beat signal by switching the frequency shift direction to an opposite direction while the frequency shift amount of the optical SSB modulator is kept at the second frequency; and
  detecting a difference in a propagation distance between the reference light and the measurement light based on frequency analysis results of the first beat signal, the second beat signal, and the third beat signal.

13. A measurement apparatus comprising:
  a laser apparatus for outputting a frequency-modulated laser beam with a plurality of modes, the laser apparatus including an optical cavity that has a gain medium for amplifying a light to be input, and an optical SSB modulator for shifting a frequency of the light amplified by the gain medium, and control circuitry configured to control the optical SSB modulator to shift a frequency of a light to be input to the optical SSB modulator;
  a branch that branches a portion of the frequency-modulated laser beam output by the laser apparatus as a reference light and at least some of the remaining portion of the frequency-modulated laser beam as a measurement light;
  a beat signal generator that generates a beat signal by mixing the reference light and a reflected light that is reflected by radiating the measurement light onto an object to be measured; and
  a detector that detects a difference in a propagation distance between the reference light and the measurement light by frequency-analyzing the beat signal, wherein the optical SSB modulator has
- a substrate,
- a main Mach-Zehnder waveguide that is provided on the substrate and has a first arm waveguide and a second arm waveguide,
- a first sub Mach-Zehnder waveguide provided on the first arm waveguide, and
- a second sub Mach-Zehnder waveguide provided on the second arm waveguide, wherein the control circuitry is configured to invert a phase of an RF signal to be supplied to an electrode that is provided on the substrate and corresponds to the main Mach-Zehnder waveguide, the first sub Mach-Zehnder waveguide, and the second sub Mach-Zehnder waveguide, and switches the frequency shift direction, wherein the control circuitry is configured to switch the frequency shift direction of the optical SSB modulator to one of a positive side or a negative side, and then causes the detector to frequency-analyze the beat signal, and wherein the detector detects a difference in a propagation distance between the reference light and the measurement light based on frequency analysis results of (i) a positive-side beat signal generated when the frequency shift direction of the optical SSB modulator is the positive side and (ii) a negative-side beat signal generated when the frequency shift direction of the optical SSB modulator is the negative side.

\* \* \* \* \*